(12) United States Patent
He et al.

(10) Patent No.: US 11,327,628 B2
(45) Date of Patent: May 10, 2022

(54) METHOD FOR PROCESSING LIVE STREAMING DATA AND ELECTRONIC DEVICE

(71) Applicant: BEIJING DAJIA INTERNET INFORMATION TECHNOLOGY CO., LTD., Beijing (CN)

(72) Inventors: Jiajie He, Beijing (CN); Yang Zhang, Beijing (CN); Yuyang Xu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/394,656

(22) Filed: Aug. 5, 2021

(65) Prior Publication Data
US 2022/0113843 A1  Apr. 14, 2022

(30) Foreign Application Priority Data
Oct. 13, 2020 (CN) .......................... 202011093068.0

(51) Int. Cl.
*G06F 3/0481* (2022.01)
*G06F 3/0486* (2013.01)
*G06F 3/04842* (2022.01)

(52) U.S. Cl.
CPC .......... *G06F 3/0481* (2013.01); *G06F 3/0486* (2013.01); *G06F 3/04842* (2013.01)

(58) Field of Classification Search
CPC ... G06F 3/0481; G06F 3/04842; G06F 3/0486
See application file for complete search history.

(56) References Cited

U.S. PATENT DOCUMENTS

| | | | | |
|---|---|---|---|---|
| 8,606,642 | B2 * | 12/2013 | Siounis | G06Q 30/0643 |
| | | | | 705/26.1 |
| 9,875,504 | B1 * | 1/2018 | Roe | G06Q 30/0635 |
| 10,397,662 | B1 * | 8/2019 | Bulusu | G06Q 10/063 |
| 10,417,695 | B1 * | 9/2019 | Hiatt | G06Q 30/0643 |

(Continued)

FOREIGN PATENT DOCUMENTS

| | | |
|---|---|---|
| CN | 107734380 A | 2/2018 |
| CN | 110139121 A | 8/2019 |

(Continued)

OTHER PUBLICATIONS

Machine translation of the reference CN110139121 (published on Aug. 16, 2019) (Year: 2019).*

(Continued)

*Primary Examiner* — Tuyetlien T Tran
(74) *Attorney, Agent, or Firm* — Kolitch Romano LLP

(57) ABSTRACT

Provided is a method for processing live streaming data. An article selection interface is displayed in response to a publish request of an anchor account is received to display at least one article object, such that an anchor can select at least one target article object from the at least one article object, and further, the at least one target article object and related information of the at least one target article object can be displayed on a live streaming interface by at least one floating window, wherein the related information includes an allowable trading condition of the target article object.

19 Claims, 18 Drawing Sheets

(56) References Cited

U.S. PATENT DOCUMENTS

| | | | |
|---|---|---|---|
| 10,440,435 B1 | 10/2019 | Erdmann et al. | |
| 10,575,045 B1* | 2/2020 | Kruse | G06Q 30/0277 |
| 10,922,744 B1* | 2/2021 | Mahajan | G06T 7/70 |
| 2002/0091739 A1* | 7/2002 | Ferlitsch | G06F 3/04815 |
| | | | 715/273 |
| 2005/0281470 A1* | 12/2005 | Adams | H04N 21/25875 |
| | | | 382/232 |
| 2009/0274384 A1* | 11/2009 | Jakobovits | G16H 30/20 |
| | | | 382/254 |
| 2011/0162002 A1* | 6/2011 | Jones | H04N 21/812 |
| | | | 725/32 |
| 2012/0233070 A1* | 9/2012 | Caiman | G06Q 20/36 |
| | | | 705/41 |
| 2013/0254714 A1* | 9/2013 | Shin | G06F 3/0488 |
| | | | 715/810 |
| 2013/0268898 A1* | 10/2013 | Miki | H04N 1/00198 |
| | | | 715/847 |
| 2015/0121424 A1* | 4/2015 | Wellen | H04N 21/6125 |
| | | | 725/38 |
| 2015/0262216 A1* | 9/2015 | Aziz | G06Q 30/0235 |
| | | | 705/14.35 |
| 2015/0302474 A1* | 10/2015 | Lampert | G06Q 30/0255 |
| | | | 705/14.53 |
| 2016/0104219 A1* | 4/2016 | Greenberg | G06Q 30/016 |
| | | | 705/26.1 |
| 2017/0278135 A1* | 9/2017 | Majumdar | G06K 9/00362 |
| 2018/0098028 A1 | 4/2018 | Mu | |
| 2018/0160158 A1* | 6/2018 | Liu | G06Q 30/02 |
| 2018/0211298 A1* | 7/2018 | McDevitt | G06Q 30/0623 |
| 2018/0276314 A1* | 9/2018 | Zhang | G06F 16/907 |
| 2019/0200054 A1* | 6/2019 | Dharmaji | H04L 69/162 |
| 2019/0213655 A1* | 7/2019 | Watkins | G06Q 30/0621 |
| 2019/0238908 A1* | 8/2019 | Lu | H04L 29/06 |
| 2019/0281359 A1* | 9/2019 | Johnson | H04N 21/4782 |
| 2019/0334699 A1* | 10/2019 | Tang | H04L 67/32 |
| 2020/0128286 A1* | 4/2020 | Anders | H04N 21/2542 |
| 2020/0285439 A1* | 9/2020 | Chen | G06F 21/51 |
| 2020/0322683 A1* | 10/2020 | Zhang | H04L 65/40 |
| 2021/0144452 A1* | 5/2021 | Cutaia | H04N 21/23614 |
| 2021/0248579 A1* | 8/2021 | Moritz | G06K 9/00671 |
| 2021/0344972 A1* | 11/2021 | Burkhart | H04N 21/25883 |

FOREIGN PATENT DOCUMENTS

| | | |
|---|---|---|
| CN | 110149525 A | 8/2019 |
| CN | 110213607 A | 9/2019 |
| CN | 110225408 A | 9/2019 |
| CN | 110267059 A | 9/2019 |
| CN | 110730357 A | 1/2020 |
| CN | 110830810 A | 2/2020 |
| CN | 111416985 A | 7/2020 |
| CN | 111711831 A | 9/2020 |
| CN | 111741318 A | 10/2020 |

OTHER PUBLICATIONS

The State Intellectual Property Office of People's Republic of China, First Office Action in Application No. 202011093068.0, dated Apr. 20, 2021, which is a foreign counterpart application corresponding to this U.S. Patent Application, to which this application claims priority.

The State Intellectual Property Office of People's Republic of China, Decision of Rejection of Chinese Application No. 202011093068.0, dated Jun. 29, 2021, which is a foreign counterpart application corresponding to this U.S. Patent Application, to which this application claims priority.

The Hague, European Search Report Communication Pursuant to Rule 62 EPC, dated Feb. 1, 2022 in Patent Application No. EP 21190353.9, which is a foreign counterpart application to this application.

Notification to Grant Patent Right for Invention of Chinese Application No. 202011093068.0 dated Jan. 12, 2022, which is a foreign counterpart application to this application.

* cited by examiner

METHOD FOR PROCESSING LIVE STREAMING DATA AND ELECTRONIC DEVICE

This application is based on and claims priority to Chinese Patent Application No. 202011093068.0, filed on Oct. 13, 2020, the disclosure of which is herein incorporated by reference in its entirety.

TECHNICAL FIELD

The present disclosure relates to the field of computer technologies, and in particular, relates to a method for processing live streaming data and an electronic device.

BACKGROUND

With the continuous development of live streaming and e-commerce, the live streaming and the e-commerce are combined more and more closely. As a new sales method, an e-commerce live streaming has received extensive attention from users. In the e-commerce live streaming, an anchor introduces articles in a live streaming room, such that audiences get to know the performance of the article and may purchase the article in the live streaming room due to the introduction of the anchor in the live streaming.

SUMMARY

The present disclosure provides a method for processing live streaming data and an electronic device.

According to a first aspect of embodiments of the present disclosure, a method for processing live streaming data is provided. The method is executed by an electronic device, and includes: displaying an article selection interface in response to a publish request of an anchor account in a live streaming room, wherein the article selection interface includes at least one article object, and the publish request is configured to publish a to-be-traded article object in the live streaming; determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

The article selection interface is displayed in response to receiving the publish request of the anchor account, so as to display the at least one article object, such that the anchor can select the at least one target article object from the at least one article object, and the at least one target article object and related information of the at least one target article object are displayed by the at least one floating window on the live streaming interface, wherein the related information includes the allowable trade condition of the at least target article object, the variety of displayed information is increased, thereby improving the intelligence and flexibility of the article display process. In addition, an audience can see the target article object and the related information thereof directly from the floating window displayed on the live streaming interface, without any manual operation, such that operation cost is reduced, and man-machine interaction efficiency and article display efficiency in the live streaming room are improved.

According to a second aspect of the embodiments of the present disclosure, a method for processing live streaming data is provided. The method is executed by an electronic device, and includes: displaying, based on a received video stream of a live streaming room of an anchor account, a live streaming picture of the live streaming room; receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

The live streaming picture of the anchor account is displayed based on the received video stream, the related information of the target article objects is received, and then the target article objects and the related information are displayed on the live streaming picture by the floating window, wherein the related information includes the allowable trade condition of the target article objects. In addition, audiences can directly see these target article objects as long as they enter the live streaming room, and know the allowable trade condition of the target article objects, without any manual operation, thereby improving the article display efficiency in the live streaming room.

According to a third aspect of the embodiments of the present disclosure, an apparatus for processing live streaming data is provided. The apparatus includes: an interface displaying unit, configured to display an article selection interface in response to a publish request of an anchor account in a live streaming room, wherein the article selection interface includes at least one article object, and the publish request is configured to publish a to-be-traded article object in the live streaming; an object determining unit, configured to determine at least one target article object from the at least one article object based on a selected operation of the anchor account; and a floating window displaying unit, configured to display at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

According to a fourth aspect of the embodiments of the present disclosure, an apparatus for processing live streaming data is provided. The apparatus includes: a picture displaying unit, configured to display, based on a received video stream of the live streaming room of an anchor account, a live streaming picture of the live streaming room; a receiving unit, configured to receive related information of at least one target article object in the live streaming room, wherein the target article object is determined by the anchor account from at least one article object, and the related information includes an allowable trade condition of the at least one target article object, and the allowable trade condition being configured to indicate a condition that needs to be met by the live streaming data of the live streaming room in the case that the target article object is tradable; and a floating window displaying unit, configured to display at least one floating window on the live streaming picture, wherein the floating window is configured to display a corresponding target article object and related information.

According to a fifth aspect of the embodiments of the present disclosure, an electronic device is provided. The electronic device includes: one or more processors; and a memory configured to store an instruction executable by the processor, wherein the instruction, when executed by the processor, causes the processor to perform the following processes: displaying an article selection interface in response to a publish request of an anchor account in a live streaming room, wherein the article selection interface includes at least one article object, and the publish request is configured to publish a to-be-traded article object in the live streaming; determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

According to a sixth aspect of the embodiments of the present disclosure, an electronic device is provided. The electronic device includes: one or more processors; and a memory configured to store an instruction executable by the processor, wherein the instruction, when executed by the processor, causes the processor to perform the following processes: displaying, based on a received video stream of a live streaming room of an anchor account, a live streaming picture of the live streaming room; receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

According to a seventh aspect of the present disclosure, a storage medium storing an instruction therein is provided, wherein the instruction, when executed by a processor, causes the processor to perform the following processes: displaying an article selection interface in response to a publish request of an anchor account in a live streaming room, wherein the article selection interface includes at least one article object, and the publish request is configured to publish a to-be-traded article object in the live streaming; determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

According to an eighth aspect of the present disclosure, a storage medium storing an instruction therein is provided, wherein the instruction, when executed by a processor, causes the processor to perform the following processes: displaying, based on a received video stream of a live streaming room of an anchor account, a live streaming picture of the live streaming room; receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

According to a ninth aspect of the present disclosure, an application program product storing one or more instructions therein is provided, wherein the one or more instructions, when executed by a processor, cause the processor to perform the following processes: displaying an article selection interface in response to a publish request of an anchor account in a live streaming room, wherein the article selection interface includes at least one article object, and the publish request is configured to publish a to-be-traded article object in the live streaming; determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

According to a tenth aspect of the present disclosure, an application program product storing one or more instructions therein is provided, wherein the one or more instructions, when executed by a processor, cause the processor to perform the following processes: displaying, based on a received video stream of a live streaming room of an anchor account, a live streaming picture of the live streaming room; receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

DETAILED DESCRIPTION

User information involved in the present disclosure may be information authorized by a user or fully authorized by all parties.

Figure 1:
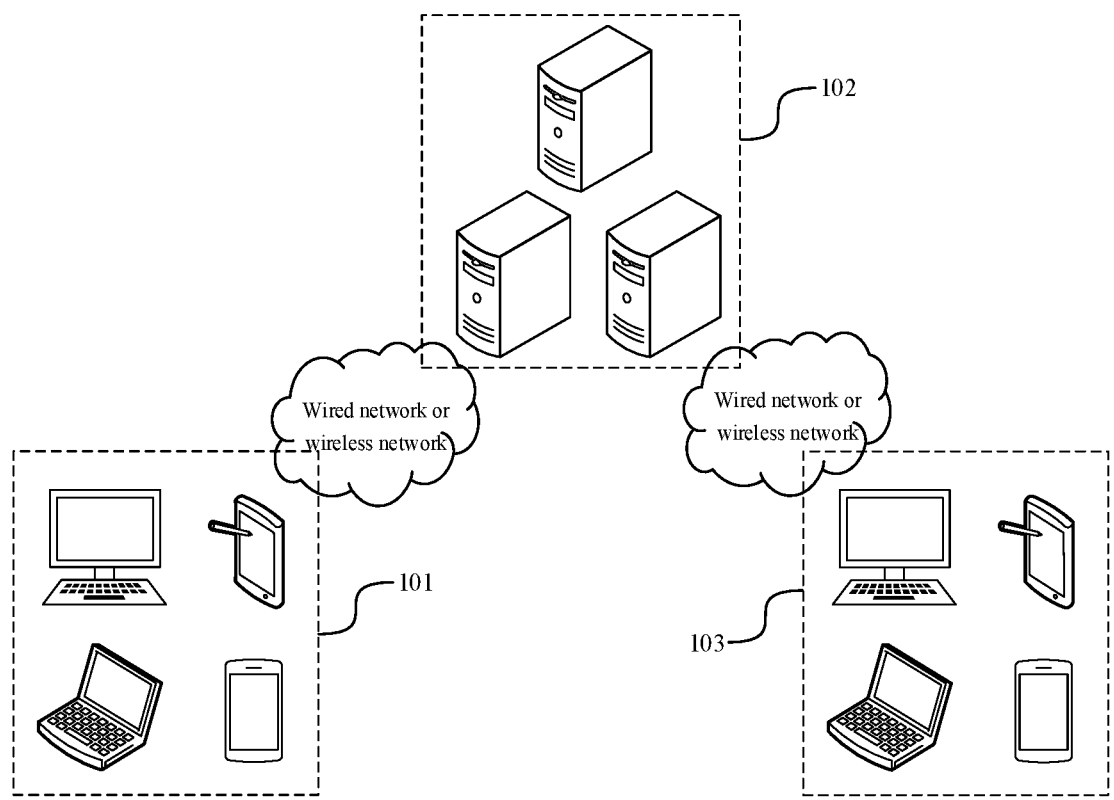
FIG. 1 is a schematic diagram showing an implementation environment of a method for processing live streaming data according to an exemplary embodiment.

FIG. 1 is a schematic diagram showing an implementation environment of a method for processing live streaming data according to an exemplary embodiment. Referring to FIG. 1, the implementation environment includes: an electronic device 101, a server 102, and an electronic device 103.

The electronic device 101 is at least one of a smart phone, a smart watch, a portable computer, a moving picture experts group audio layer III (MP3) player, a moving picture experts group audio layer IV (MP4) player, a laptop portable computer, and other devices. The electronic device 101 is an electronic device used by an anchor, and is connected to the server 102 over a wired network or a wireless network. The electronic device 101 acquires a video stream of the anchor account after acquiring a live streaming picture of the anchor by a camera component, and sends the video stream of the anchor account to the server 102. The camera component is installed inside or outside the electronic device 101, which is not limited in the embodiments of the present disclosure. The anchor may add a candidate article object for sale to a live streaming room by the electronic device 101, such that the candidate article object can be displayed on a live streaming interface of the live streaming room; and related information of the candidate article object is sent to the server 102.

The server 102 is at least one of a server, a server cluster, a cloud server, a cloud computing platform, and a virtualization center. The server 102 is connected to the electronic device 101 over the wired network or the wireless network. In addition, the server 102 is also connected to the electronic device 103 over the wired network or the wireless network. The server 102 receives the video stream of the anchor account and the related information of the candidate article object sent from the electronic device 101, and sends the video stream of the anchor account and the related information of the candidate article object to the electronic device 103. In some embodiments, the number of servers is more or less than that shown in above, and is not limited in the embodiments of the present disclosure. In some embodiments, the server 102 further includes other functional servers to provide more comprehensive and diversified services.

The electronic device 103 is at least one of a smart phone, a smart watch, a portable computer, a moving picture experts group audio layer III (MP3) player, a moving picture experts group audio layer IV (MP4) player, a laptop portable computer, and other devices. The electronic device 103 is an electronic device used by an audience, and is connected to the server 102 over the wired network or the wireless network. The electronic device 103 receives the video stream of the anchor account and the related information of the candidate article object sent from the server 102, displays a live streaming picture based on the received video stream, and displays the related information of the candidate article object on the live streaming interface.

Each of the electronic device 101 and the electronic device 103 generally refer to one of a plurality of electronic devices, and the present embodiment is only exemplified by the electronic device 101 and the electronic device 103. As can be appreciated by those skilled in the art that the number of the electronic devices mentioned above may be more or less. In some embodiments, there may be only a few electronic devices, or there may be dozens or hundreds of electronic devices, or more. Neither of the number and the types of the electronic device is limited in the embodiments of the present disclosure.

Figure 2:
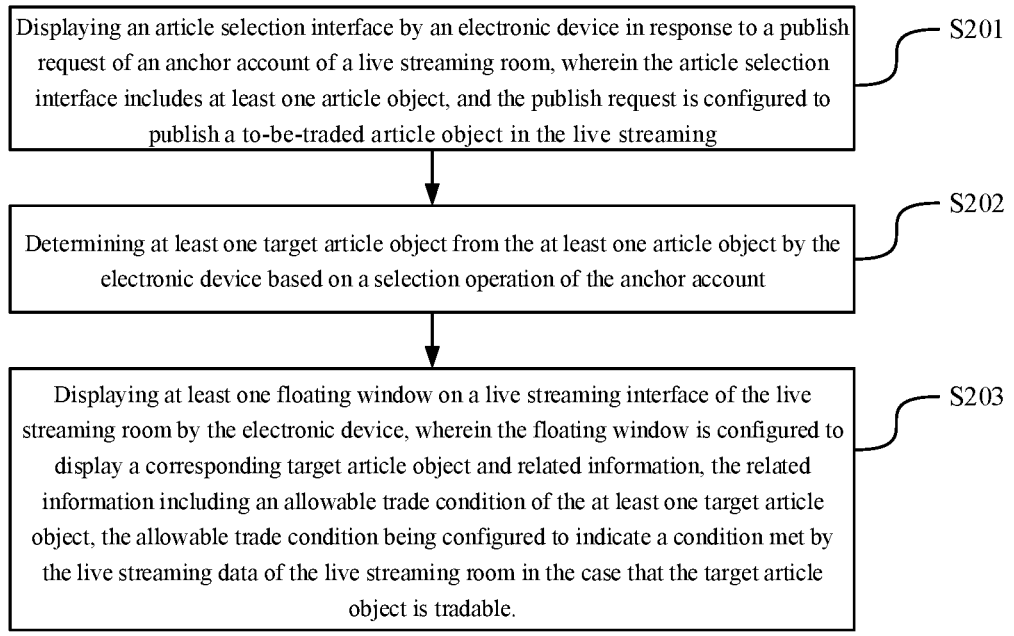
FIG. 2 is a flowchart of a method for processing live streaming data according to an exemplary embodiment.

FIG. 2 is a flowchart of a method for processing live streaming data according to an exemplary embodiment. Referring to FIG. 2, the method is applicable to an electronic device executed by an anchor, and includes the following processes.

In 201, the electronic device displays an article selection interface in response to a publish request of the anchor account of a live streaming room, wherein the article selection interface includes at least one article object, and the publish request is configured to publish a to-be-traded article object in the live streaming.

In 202, the electronic device determines at least one target article object from the at least one article object based on a selection operation of the anchor account.

In 203, the electronic device displays at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable. That is, the live streaming data of the live stream room must meet certain conditions in order for the target article object to be allowed or permitted to be traded.

In the solution of the embodiment of the present disclosure, the article selection interface is displayed in response to receiving the publish request of the anchor account, so as to display the at least one article object, such that the anchor can select the at least one target article object from the at least one article object, and the at least one target article object and related information of the at least one target article object are displayed by the at least one floating window on the live streaming interface, wherein the related information includes the allowable trade condition of the at least target article object. Because the variety of displayed information is increased, the intelligence and flexibility of the article display process are improved. In addition, an audience can see the target article object and the related information thereof directly from the floating window displayed on the live streaming interface without any manual operation, such that operation cost is reduced, and human-machine interaction efficiency and article display efficiency in the live streaming room are improved.

In some embodiments, the article selection interface includes a target control and at least one selection control, wherein each of the at least one article object corresponds to one of the at least one selection control, and the target control is configured to provide a setting function of the target article object; and determining the at least one target article object from the at least one article object based on the selection operation of the anchor account includes:

determining, in response to a selection operation on the at least one selection control, a selected article object corresponding to the at least one selection control as at least one candidate article object;

displaying an article setting interface in response to a trigger operation on the target control, the article setting interface including the at least one candidate article object; and determining the at least one target article object from the at least one candidate article object in response to an operation on the at least one candidate article object on the article setting interface.

In some embodiments, the article setting interface includes at least one setting control, wherein each of the at least one candidate article object corresponds to one of the at least one setting control and the setting control is configured to set the related information of the target article object and the target article object; and determining the at least one target article object from the at least one candidate article object in response to the operation on the at least one candidate article object on the article setting interface includes:

displaying, in response to a trigger operation on a target setting control, an information setting interface corresponding to the target setting control, wherein the target setting control is a setting control corresponding to any one of the at least one candidate article object, and the information interface is configured to provide a setting function of the related information; and determining, in response to the setting operation on the information setting interface, a candidate article object corresponding to the target setting control as the target article object.

In some embodiments, the information setting interface includes at least one input control; and determining, in response to the setting operation on the information setting interface, the candidate article object corresponding to the target setting control as the target article object includes:

acquiring in response to an input operation on the at least one input control, related information of the candidate article object corresponding to the target setting control; and determining, in response to a setting complete operation on the information setting interface, the candidate article object corresponding to the target setting control as the target article object.

In some embodiments, acquiring, in response to the input operation on the at least one input control, the related information of the candidate article object corresponding to the target setting control includes:

acquiring, in response to the input operation on the at least one input control, an allowable trade condition of the candidate article object corresponding to the target setting control.

In some embodiments, in response to determining the candidate article object corresponding to the target setting control as the target article object, the method further includes:

displaying an updated article setting interface, wherein the target article object corresponds to a modification setting control and a deletion setting control on the updated article setting interface.

In some embodiments, the article setting interface includes a style setting region, wherein the style setting region is configured to set display format of the floating window, and the style setting region includes a horizontal display control and a longitudinal display control; and displaying the at least one floating window on the live streaming interface of the live streaming room includes one of:

displaying the at least one floating window horizontally and parallelly on the live streaming interface in response to a trigger operation on the horizontal display control; and displaying the at least one floating window longitudinally and parallelly on the live streaming interface in response to a trigger operation on the longitudinal display control.

In some embodiments, the article setting interface includes a search control; and in response to displaying the article setting interface in response to the trigger operation on the target control, the method further includes:

acquiring an article keyword input in the search control in response to a trigger operation on the search control;

determining a target candidate article object matching with the article key from the at least one candidate article object; and displaying the target candidate article object matching with the article keyword.

In some embodiments, the target candidate article object corresponds to one setting control; and in response to displaying the target candidate article object matching with the article keyword, the method further includes:

displaying an information setting interface corresponding to the target candidate article object in response to a trigger operation on the setting control corresponding to the target candidate object, wherein the information setting interface is configured to provide a setting function of the related information.

In some embodiments, the live streaming interface includes an article management control; and in response to displaying the at least one floating window on the live streaming interface of the live streaming room, the method further includes:

displaying a target article display interface in response to a trigger operation on the article management control, wherein the target article display interface includes the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

In some embodiments, in response to displaying the at least one floating window on the live streaming interface of the live streaming room, the method further includes:

acquiring live streaming data of the live streaming room, wherein the live streaming data includes at least one of a number of audiences, a type of the audiences, a live streaming duration, and a number of live streaming feedbacks; and adding a corresponding target article object to an article trade list in the live streaming room in the case that the live streaming data meets the allowable trade condition of the at least one target article object.

Figure 3:
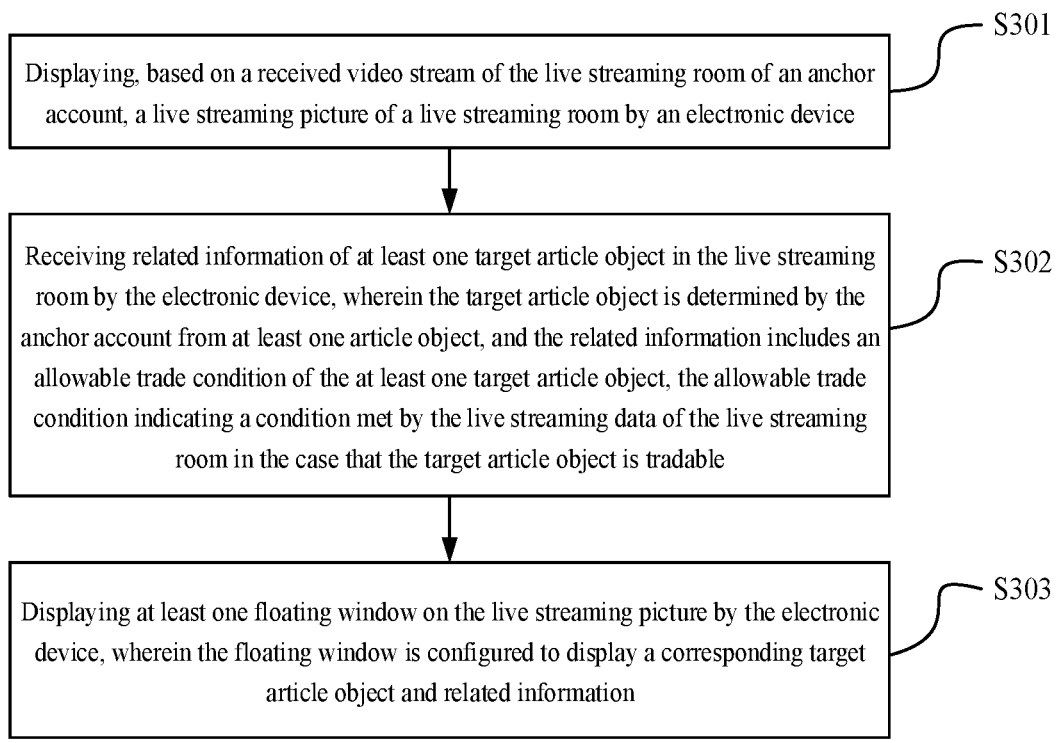
FIG. 3 is a flowchart of another method for processing live streaming data according to an exemplary embodiment.

FIG. 3 is a flowchart of another method for processing live streaming data according to an exemplary embodiment. Referring to FIG. 3, the method is applicable to an electronic device executed by an audience, and includes the following processes.

In 301, the electronic device displays, based on a received video stream of a live streaming room of an anchor account, a live streaming picture of a live streaming room.

In 302, the electronic device receives related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable.

In 303, the electronic device displays at least one floating window on the live streaming picture, wherein the floating window is configured to display a corresponding target article object and related information.

In the solution of the embodiment of the present disclosure, the live streaming picture of the anchor account is displayed based on the received video stream, the related information of the target article objects is received, and then the target article objects and the related information are displayed on the live streaming picture by the floating window, wherein the related information includes the allowable trade condition of the target article objects. In addition, audiences can directly see these target article objects as long as they enter the live streaming room, and know the allowable trade condition of the target article objects, without any manual operation, thereby improving the article display efficiency in the live streaming room.

In some embodiments, displaying the at least one floating window on the live streaming picture includes:

acquiring setting information of the live streaming room, wherein the setting information includes first setting information and second setting information, wherein the first setting information instructs setting a display style of the at least one floating window as a horizontal display style, and the second setting information instructs setting the display style of the at least one floating window as a longitudinal display style; and displaying the at least one floating window based on a display style instructed by the setting information.

In some embodiments, the live streaming interface of the live streaming room includes a style setting control; and in response to displaying the at least one floating window on the live streaming picture, the method further includes:

displaying a style setting interface in response to a trigger operation on the style setting control, wherein the style setting interface is configured to set a display style of the at least one floating window, and includes a horizontal display control and a longitudinal display control.

In some embodiments, in response to displaying the at least one floating window on the live streaming picture, the method further includes:

adjusting a display position of the at least one floating window in response to a drag operation on the at least one floating window.

In some embodiments, adjusting the display position of the at least one floating window in response to the drag operation on the at least one floating window includes one of:

deleting the at least one floating window from the live streaming picture in the case that a corresponding position is a position in a target region upon completion of the drag operation; and determining the corresponding position upon completion of the drag operation as an adjusted display position of the at least one floating window in the case that the corresponding position is a position in a non-target region upon completion of the drag operation.

In some embodiments, in response to displaying the at least one floating window on the live streaming picture, the method further includes:

displaying an article detail interface in response to a trigger operation on any one of the at least one floating window, wherein the article detail interface is configured to display article details of a corresponding target article object.

In some embodiments, the method further includes:

adding a corresponding target article object to an article trade list in the live streaming room in the case that the live streaming data of the live streaming room meets the allowable trade condition of the at least one target article object.

Figure 4:
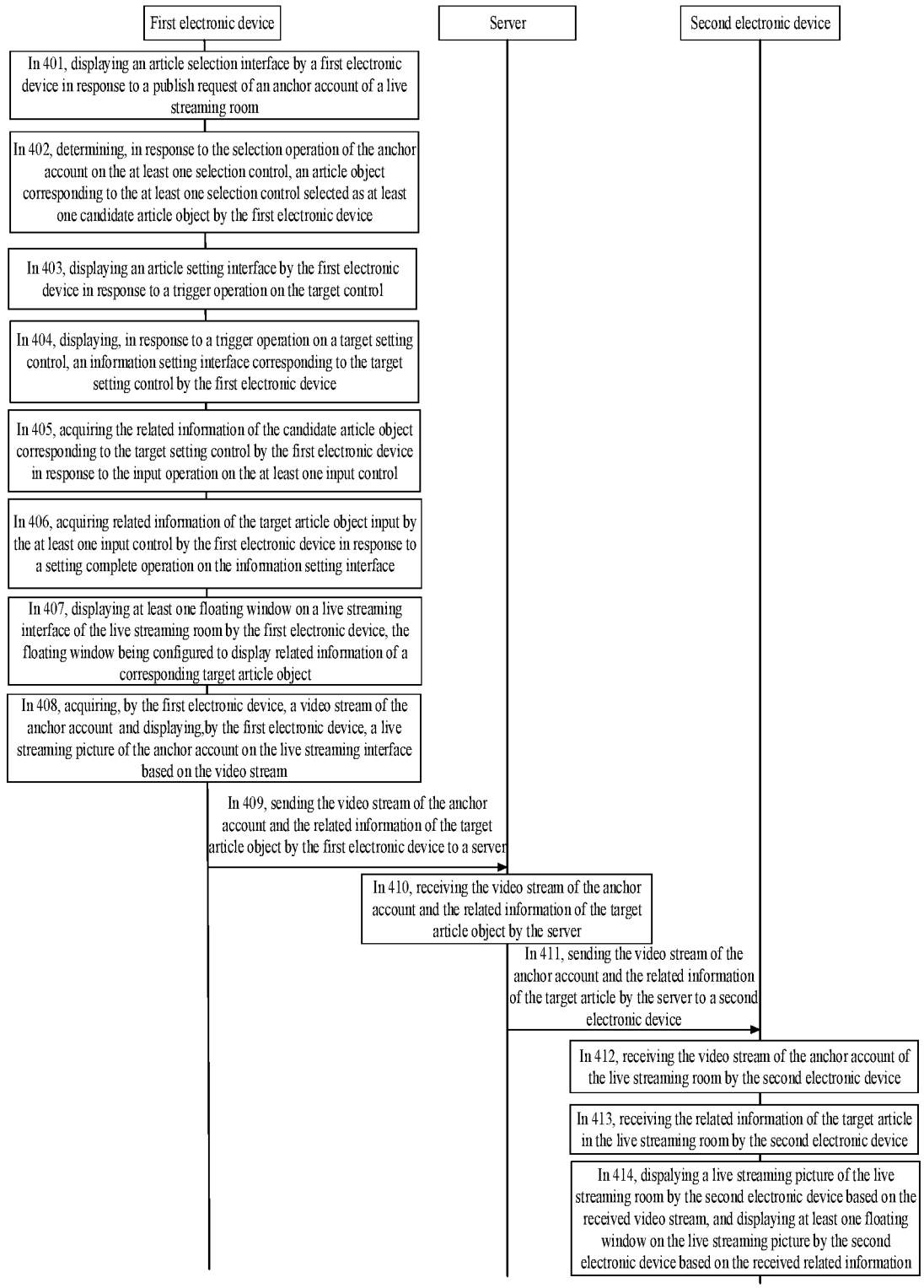
FIG. 4 is a flowchart of yet another method for processing live streaming data according to an exemplary embodiment.

FIG. 4 is a flowchart of yet another method for processing live streaming data according to an exemplary embodiment. Referring to FIG. 4, the method includes the following processes.

In 401, a first electronic device displays an article selection interface in response to a publish request of an anchor account of a live streaming room, wherein and the publish request is configured to publish a to-be-traded article object in the live streaming, the article selection interface includes at least one article object, a target control and at least one selection control, wherein each of the at least one article object corresponds to one of the at least one selection control.

In some embodiments, the anchor account is associated with a virtual store including at least one article object for sale, and the anchor can sell these article objects by live streaming. The anchor triggers a live streaming application program installed in the first electronic device. The first electronic device sends an article acquisition request carrying the anchor account to the server in response to the trigger operation of the anchor. The server determines the virtual shop associated with the anchor account carried by the article acquisition request in response to the article acquisition request from the first electronic device, further acquires article information (including an article image, article price, and the like) of the at least one article object from the virtual store, and sends the acquired article information to the first electronic device, such that the first electronic device can receive the article information and display the received article information on the article selection interface.

Figure 5:
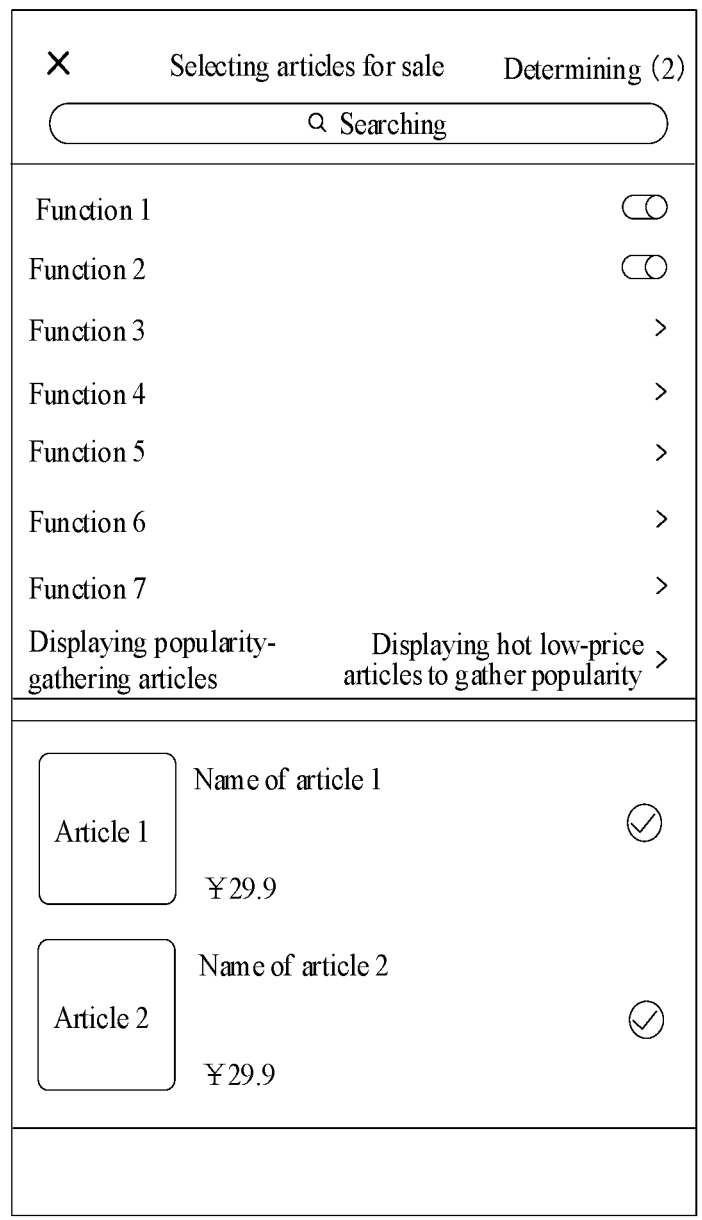
FIG. 5 is an interface schematic diagram of an article selection interface according to an exemplary embodiment.

The article selection interface is shown in FIG. 5 which is an interface schematic diagram of an article selection interface according to an exemplary embodiment. Article objects that have been shelved in the virtual store associated with the anchor account are displayed on the article selection interface. Each article object is provided with a corresponding selection control (i.e., a check button). The article selection interface further includes a target control (i.e., a popularity-gathering article display button) configured to provide a setting function of displaying popularity-gathering articles, so as to set target article objects for attracting audiences through the setting function of displaying popularity-gathering articles.

The target control and the at least one selection control are provided on the article selection interface, such that the anchor can select the candidate article objects for sale this time by the selection control. Further, the candidate article objects are displayed by the target control, such that the anchor can select the target article object to be used to attract the audience from the displayed candidate article objects, thereby attracting more audiences by the target article object.

The article selection interface also includes other function entries to provide more diversified functions. Still taking the article selection interface shown in FIG. 5 as an example, in the article selection interface shown in FIG. 5, 7 function entries are provided to provide functions 1, function 2, . . . function 7 and the like other than the setting function of displaying popularity-gathering articles, thereby enriching the diversity of the live streaming data processing process, and increasing the amount of information contained in the live streaming data processing process.

In 402, the first electronic device determines, in response to a selection operation of the anchor account on the at least one selection control, at least one candidate article object from the selected article objects corresponding to the at least one selection control.

Referring to FIG. 5, on the article selection interface as shown in FIG. 5, each article object is provided with a corresponding selection control (i.e., the check button), and the anchor sets one or more article objects as candidate article objects for sale in this live streaming by triggering the displayed selection control(s) corresponding to the one or more article objects in the at least one article object.

In 403, the first electronic device displays an article setting interface in response to a trigger operation on the target control, wherein the article setting interface includes the at least one candidate article object and at least one setting control, wherein each of the at least one candidate article object corresponds to one of the at least one setting control, and the setting control is configured to set the related information of the target article object and the target article object.

Referring to FIG. 5, the anchor triggers the target control (i.e., the popularity-gathering article display button) on the article selection interface in response to selecting the candidate article objects for sale this time, and the first electronic displays an article setting interface in response to the trigger operation on the target control.

Figure 6:
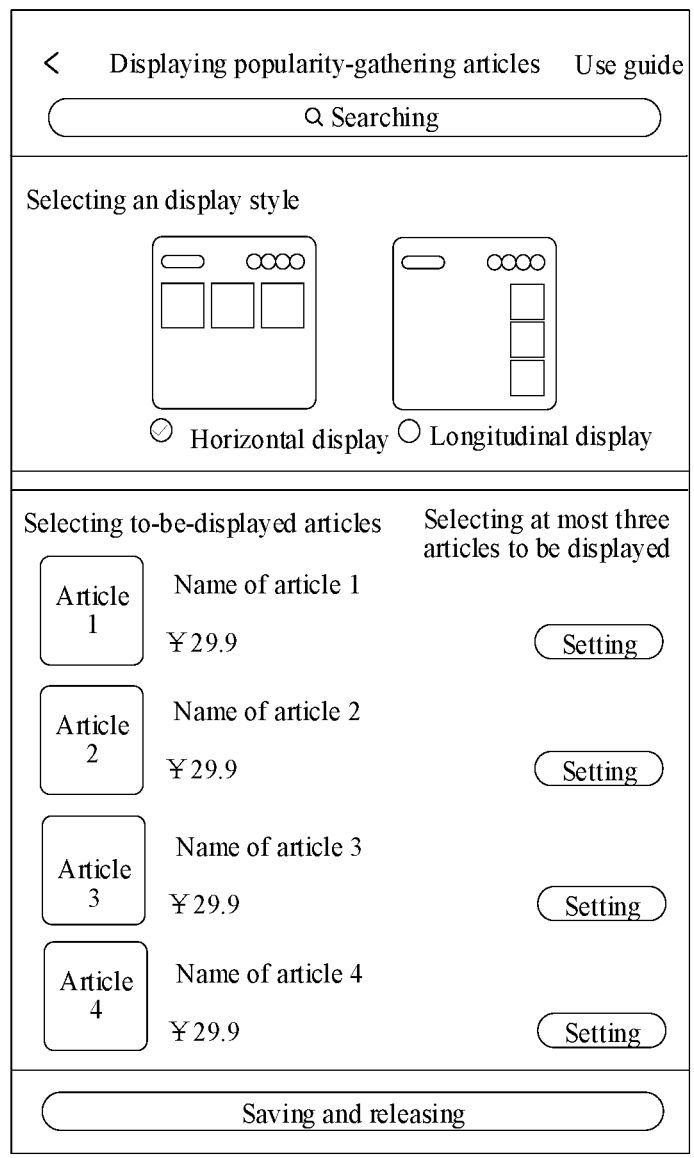
FIG. 6 is an interface schematic diagram of an article setting interface according to an exemplary embodiment.

The article setting interface may refer to FIG. 6, which is an interface schematic diagram of an article setting interface according to an exemplary embodiment. The article setting interface includes the at least one candidate article object selected by the anchor, and each candidate article object is provided with a corresponding setting control (i.e., a setting button), such that the anchor can set the target article object by the setting control.

In 404, the first electronic device displays, in response to a trigger operation on a target setting control, an information setting interface corresponding to the target setting control, wherein the target setting control is a setting control corresponding to any one of the at least one candidate article object, the information interface is configured to provide a setting function of the related information, and the information setting interface includes a save control and at least one input control.

In some embodiment, in response to each setting control is triggered, the first electronic device displays the information setting interface corresponding to the triggered setting control, such that the anchor can fill in the related information of the target article object on the information setting interface.

By providing the corresponding setting control for each of the candidate article objects on the article setting interface, the anchor triggers the setting control corresponding to any one of the candidate article objects, an interface of the electronic device jumps to the information setting interface corresponding to the candidate article object in response to the trigger operation of the anchor, such that the related information of any one of the candidate article objects can be set through the information setting interface.

The related information can be obtained by the at least one input control, the information setting interface further includes at least one input control, such that the anchor account can input the related information by the at least one input control.

Figure 7:
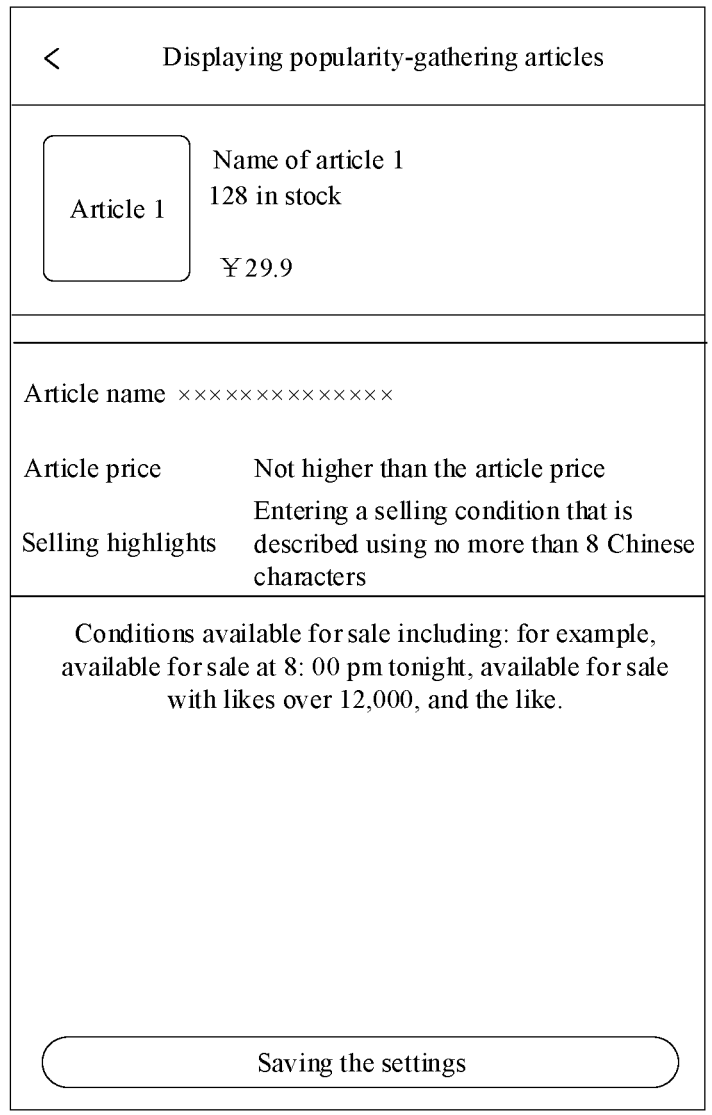
FIG. 7 is an interface schematic diagram of an information setting interface according to an exemplary embodiment.

The information setting interface may refer to FIG. 7 which is an interface schematic diagram of an information setting interface according to an exemplary embodiment. In the information setting interface shown in FIG. 7, the information setting interface includes three input controls, each of which is configured to input related information of the selected candidate article objects.

The related information includes information related to the target article object in the trade process, such as an article name, an article price, an allowable trade condition (i.e., selling highlights), and the like. In some embodiments, the related information further includes other contents, which are not limited in the embodiments of the present disclosure. In some embodiments, the related information includes an article image.

By displaying the related information, the audience can quickly know the target article object through the article name, the article price, the allowable trade condition, so as to achieve a purpose of attracting audiences.

In some embodiments, the allowable trade condition (i.e., selling highlights) of the target article object includes available for sale at a particular time, available for sale with likes, duration purchase authority, fan base purchase authority, and the like. In some embodiments, the allowable trade condition is of other types, which are not limited in the embodiments of the present disclosure. In some embodiments, the allowable trade condition is available for sale at 8:00 pm tonight, available for sale with likes not less than 10,000, available for sale once the total watching time of the audience reaches 2,000 minutes, and the like. The at least one target article object is out of the article trade list of the live streaming room in the case that the allowable trade condition of the at least one target article object is not met.

In 405, the first electronic device acquires the related information of the candidate article object corresponding to the target setting control in response to the input operation on the at least one input control.

Figure 8:
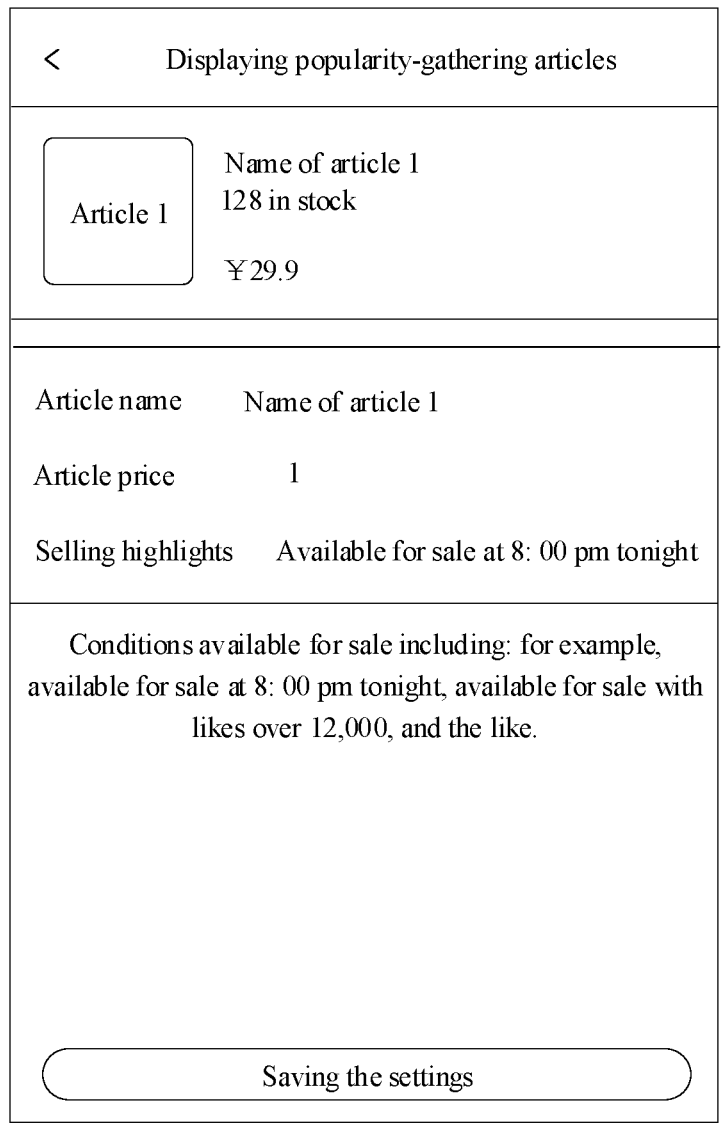
FIG. 8 is an interface schematic diagram of another information setting interface according to an exemplary embodiment.

Still take the information setting interface as shown in FIG. 7 as an example, the anchor inputs the related information (including the article name, the article price, and the allowable trade condition) of the target article object on the information setting interface by the input control, and the first electronic device acquires the related information filled in by the anchor in response to the input operation of the anchor, and displays the related information that has been filled in by the anchor on the information setting interface. Referring to FIG. 8 which is an interface schematic diagram of another information setting interface according to an exemplary embodiment, the information setting interface includes the related information that has been filled in.

In 406, the first electronic device acquires related information of the target article object input by the at least one input control in response to a setting complete operation on the information setting interface.

In response to related information of the target article object that has been set by the anchor through the information setting interface, the setting complete operation is triggered on the information setting interface. The first electronic device determines, in response to the setting complete operation on the information setting interface, the candidate article object corresponding to the target setting control as the target article object.

The information setting interface includes the save control. In some embodiments, in response to triggering the save control by the anchor account, the first electronic device determines that the setting operation on the information setting interface is completed in response to a trigger operation on the save control, and then determines the candidate article object corresponding to the target setting control as the target article object in response to the setting complete operation on the information setting interface.

Still take the information setting interface as shown in FIG. 7 as an example, a "saving the settings" button on the information setting interface is the save control. In response to triggering the "saving the settings" button by the anchor account, the first electronic device determines that the setting operation on the information setting interface is completed in response to a trigger operation on the "saving the settings" button.

By providing a save control on the information setting interface, the anchor can trigger the save control on the information setting interface in response to completion of the related information input by the anchor. The first electronic device acquires the related information input by the anchor in response to a trigger operation of the anchor, such that the related information is displayed on the live streaming interface to achieve the purpose of attracting audiences.

The first electronic device can detect the related information input by the anchor to ensure that the input related information conforms to target format. In some embodiments, after the anchor input is completed, the first electronic device detects the related information input by the anchor in response to the input complete operation of the anchor in the input control, and displays first prompt information in the case that the format of the related information does not meet the target format. The first prompt information is configured to prompt that the related information is input incorrectly.

In some embodiments, in the process of inputting the related information by the anchor through the input control, the first electronic device detects the content input by the anchor in real time, and displays the first prompt information in the case that the input content that does not conform to the target format is detected. The embodiments of the present disclosure do not limit the detection method specifically adopted.

By detecting the related information input by the anchor, related information of an incorrect format can be found in time, and the anchor can be prompted to modify the related information, such that the accuracy of the related information format is ensured.

Figure 9:
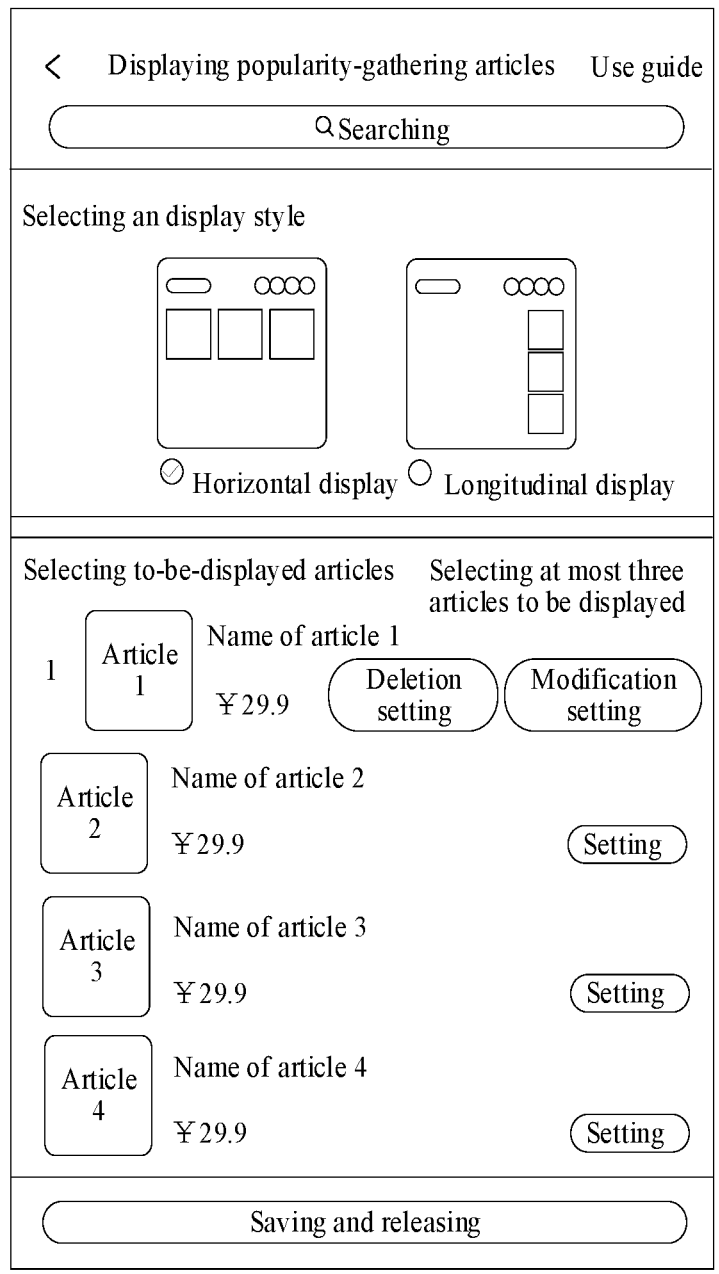
FIG. 9 is an interface schematic diagram of an updated article setting interface according to an exemplary embodiment.

In some embodiments, in response to triggering the save control on the information setting interface by the anchor, an interface of the first electronic device jumps back to the article setting interface, and the article setting interface is updated at this time. In some embodiments, the first electronic device displays the updated article setting interface in response to the trigger operation of the anchor on the save control, wherein the target article object corresponds to a modification setting control and a deletion setting control on the updated article setting interface. Referring to FIG. 9 which is an interface schematic diagram of an updated article setting interface according to an exemplary embodiment, on the article setting interface shown in FIG. 9, the article object 1 determined as the target article object corresponds to the deletion setting control (i.e. a deletion setting button) and the modification setting control (i.e. a modification setting button), while each of the target article objects 2, 3 and 4 not determined as the target article object corresponds to the setting control (i.e. the setting button).

In response to setting any article object as the target article object by the anchor, the updated article setting interface is displayed, and the modification setting control and the deletion setting control corresponding to the target article object are provided on the article setting interface, such that the target article object can be modified or deleted by the modification setting control or the deletion setting control.

Figure 10:
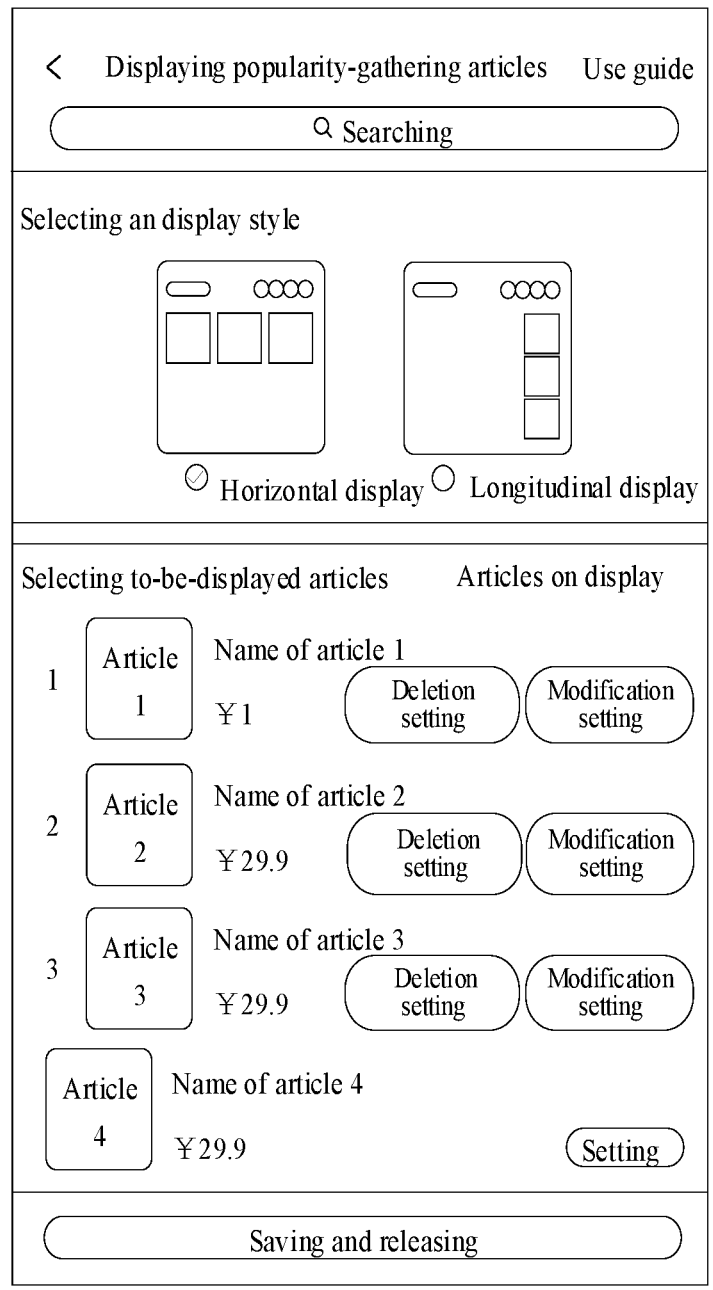
FIG. 10 is an interface schematic diagram of another updated article setting interface according to an exemplary embodiment.

The above 404 and 406 are illustrated by taking the process of setting one candidate article as the target article object as an example, and a process of setting another candidate article as the target article object is the same as the above process, and is not repeated herein. In addition, the embodiments of the present disclosure do not limit the number of the target article objects. In some embodiments, three candidate article objects are set as target article objects. Referring to FIG. 10 which is an interface schematic diagram of another updated article setting interface according to an exemplary embodiment, on the article setting interface shown in FIG. 10, each of the article objects 1, 2 and 3 determined as the target article objects corresponds to the deletion setting control (i.e. the deletion setting button) and the modification setting control (i.e. the modification setting button), while the target article object 4 not determined as the target article object corresponds to the setting control (i.e. the setting button).

Figure 11:
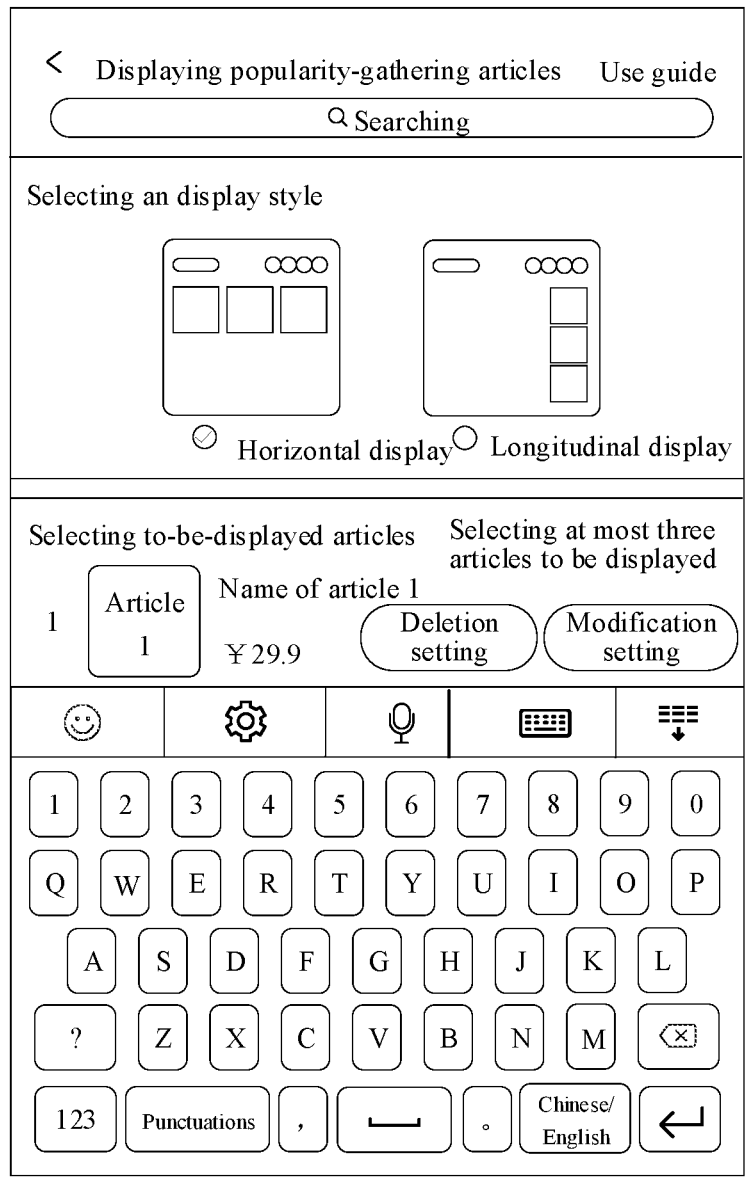
FIG. 11 is an interface schematic diagram of another article setting interface according to an exemplary embodiment.
Figure 12:
FIG. 12 is an interface schematic diagram of yet another article setting interface according to an exemplary embodiment.

The above 404 and 406 are only an exemplary method for determining the target article object. In some embodiments, the article setting interface further includes a search control for allowing an article keyword to be input and performing search based on the article keyword. The anchor triggers the search control upon completion of input of an article keyword corresponding to an article object to be searched in the search control. The first electronic device acquires the article keyword input in the search control in response to the trigger operation on the search control, determines a target candidate article object matching with the article keyword from the at least one candidate article object, and displays the target candidate article object matching with the article keyword. Referring to FIG. 11 which is an interface schematic diagram of another article setting interface according to an exemplary embodiment, the anchor inputs an article keyword to be searched in the input control through a keyboard and triggers the search control; and the first electronic device acquires the article keyword based on the trigger operation of the anchor, and displays a target candidate article object. Referring to FIG. 12 which is an interface schematic diagram of yet another article setting interface according to an exemplary embodiment, the first electronic device displays the target candidate article object on the article setting interface.

The search control is provided on the article setting interface, such that the anchor can input the article keyword by the search control. The electronic device quickly locates the target candidate article object searched by the anchor based on the article keyword input by the anchor, and displays the target candidate article object. Thus, the operation cost of the anchor is reduced, and the human-machine interaction efficiency and the efficiency of determining the target article object are improved.

The target candidate article object corresponds to one setting control configured to set the target candidate article object as the target article object. In some embodiments, in the case that the anchor needs to set the target candidate article object as the target article object, the anchor triggers the setting control corresponding to the target candidate article object; and the first electronic device displays an information setting interface corresponding to the target candidate article object in response to the trigger operation on the setting control corresponding to the target candidate article object, such that the anchor can fill in related information of the target candidate article object on the information setting interface.

By providing the setting control for the target candidate article object, after the anchor triggers the setting control, an interface of the electronic device jumps to the information setting interface of the target candidate article object in response to the trigger operation of the anchor, such that the anchor can input related information of the target candidate article object on the information setting interface.

In S407, the first electronic device displays at least one floating window on a live streaming interface of the live streaming room, the floating window being configured to display related information of a corresponding target article object.

With respect to the article setting interface in 403, the article setting interface further includes a style setting region including a horizontal display control and a longitudinal display control, the anchor sets a display type of the at least one floating window as a horizontal display type or a longitudinal display type by triggering the horizontal display control or the longitudinal display control. Referring to FIG. 6, in the upper half region of the article setting interface as shown in FIG. 6, the type setting region is included, and is configured to set the display type of the at least one floating window.

In the case that the horizontal display control or the longitudinal display control is triggered by the anchor, the first electronic device displays the at least one floating window based on the selection of the anchor in response to the trigger operation of the anchor on the horizontal display control or the longitudinal display control. In some embodiments, the first electronic device displays the at least one floating window horizontally and parallelly on the live streaming interface in response to a trigger operation on the horizontal display control. In some embodiments, the first electronic device displays the at least one floating window longitudinally and parallelly on the live streaming interface in response to a trigger operation on the longitudinal display control.

Figure 13:
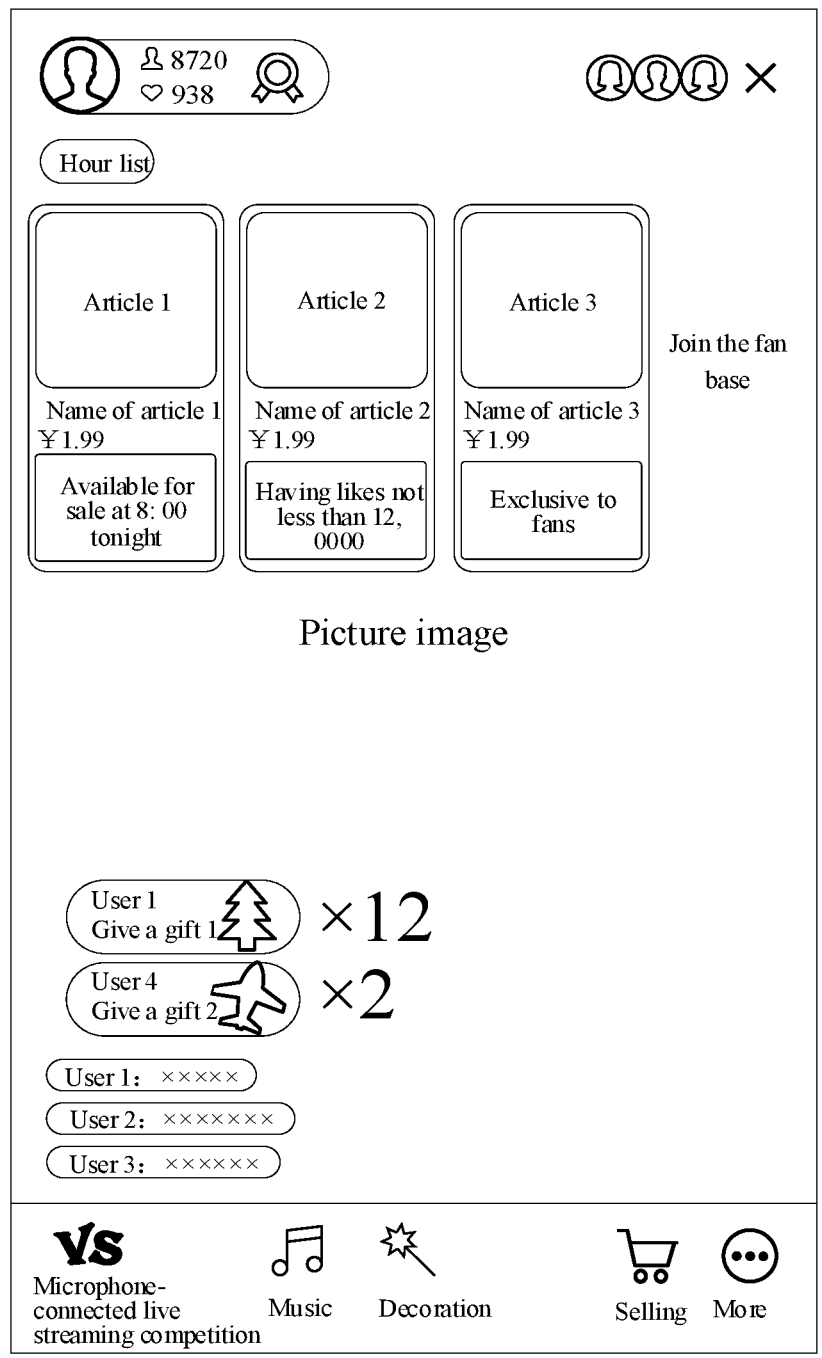
FIG. 13 is an interface schematic diagram of a live streaming interface according to an exemplary embodiment.

Referring to FIG. 13 which is an interface schematic diagram of a live streaming interface according to an exemplary embodiment, the first electronic device displays the at least one floating window in a display mode as shown in FIG. 13.

In 408, the first electronic device acquires a video stream of the anchor account, and displays a live streaming picture of the anchor account on the live streaming interface based on the video stream.

In some embodiments, the first electronic device acquires a picture image of the anchor account by a camera component, generates the video stream based on the acquired picture image, and displays a live streaming picture of the anchor account on the live streaming interface based on the video stream.

The live streaming interface includes an article management control configured to modify or delete the target article object. In the case that the anchor needs to modify or delete the target article object, the anchor triggers the article management control; and the first electronic device displays a target article display interface in response to a trigger operation on the article management control. The target article display interface includes at least one target article object, and a deletion setting control and a modification setting control which correspond to the at least one target article object. The deletion setting control is configured to delete a target article object corresponding to the deletion setting control from the at least one target article object. The modification setting control is configured to modify related information of a target article object corresponding to the modification setting control.

By providing the article management control on the live streaming interface, the electronic device displays the target article display interface as soon as the anchor triggers the article management control during the live streaming process, such that the anchor can modify or delete the target article object by the deletion setting control or the modification setting control on the live streaming interface, thereby improving the display flexibility of articles. In addition, the anchor can modify or delete the target article object at any time during the live streaming process.

In 409, the first electronic device sends the video stream of the anchor account and the related information of the target article object to a server.

In 410, the server receives the video stream of the anchor account and the related information of the target article object.

In 411, the server sends the video stream of the anchor account and the related information of the target article to a second electronic device.

In 412, the second electronic device receives the video stream of the anchor account of the live streaming room.

In 413, the second electronic device receives the related information of the target article in the live streaming room.

In 414, the second electronic device displays a live streaming picture of the live streaming room based on the received video stream, and displays at least one floating window on the live streaming picture.

The at least one floating window is configured to display the related information. In some embodiments, the at least one floating window is configured to display an article image, an article name, an article price, an underlined original price of an article, and an allowable trade condition. In some embodiments, the at least one floating window is further configured to display other contents, which are not limited in the embodiments of the present disclosure.

Figure 14:
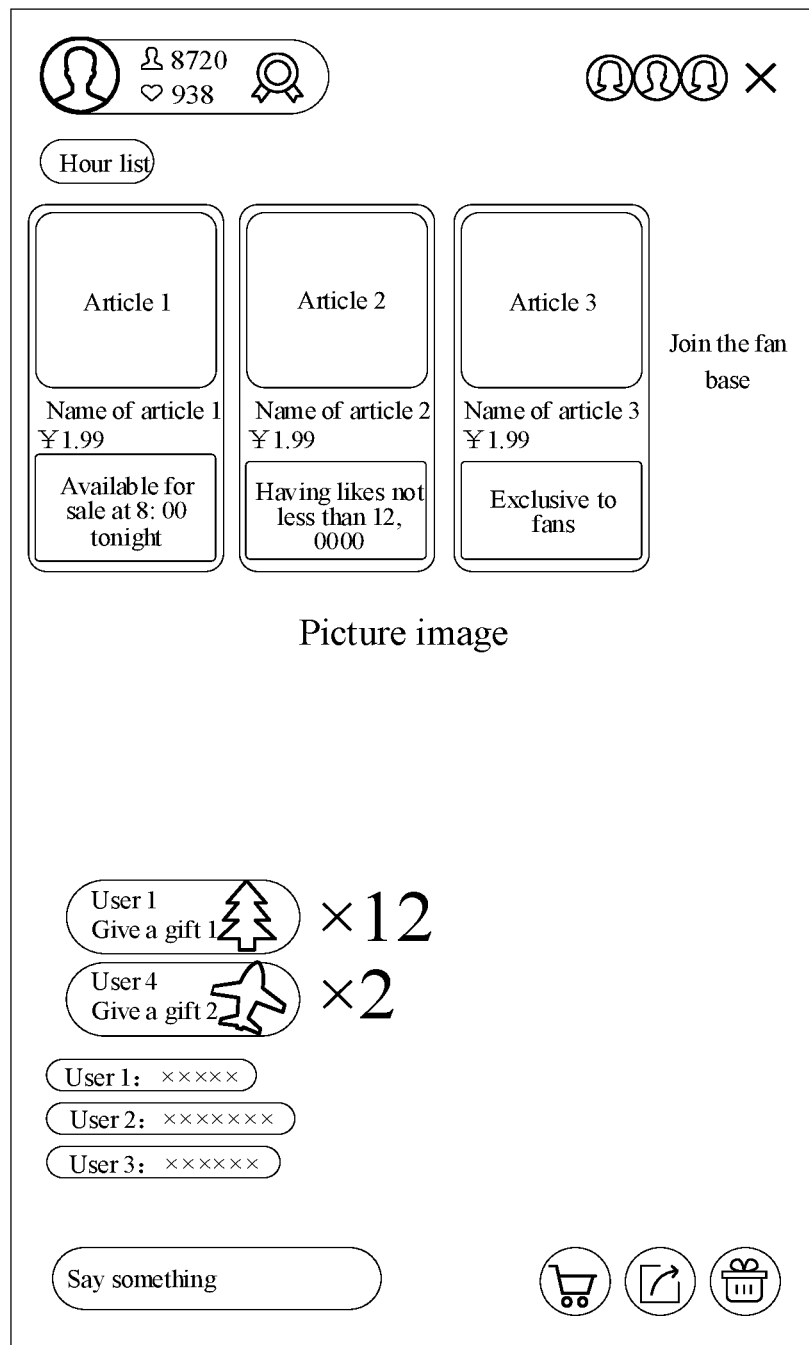
FIG. 14 is a schematic diagram of a display style of a floating window according to an exemplary embodiment.
Figure 15:
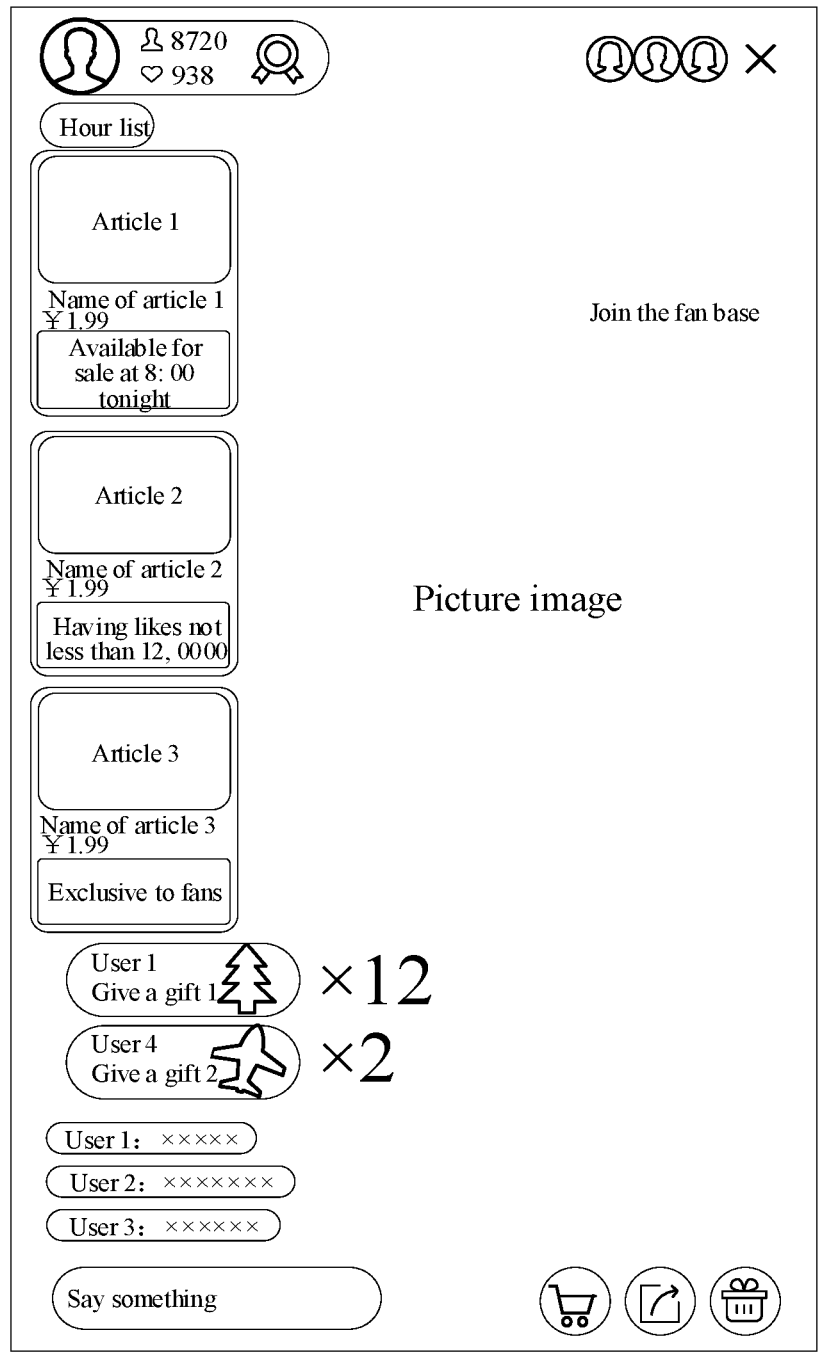
FIG. 15 is a schematic diagram of another display style of the floating window according to an exemplary embodiment.

In response to displaying the floating window, the first electronic device acquires setting information of the live streaming room, and displays the at least one floating window based on the display style instructed by the setting information. The setting information includes first setting information and second setting information. The first setting information instructs setting a display style of the at least one floating window as a horizontal display style, and the second setting information instructs setting the display style of the at least one floating window as a longitudinal display style. Referring to FIGS. 14 and 15, each of which is a schematic diagram of a display style of a floating window according to an exemplary embodiment, on the interface shown in FIG. 14, the display style of the at least one floating window is the horizontal display style; and on the interface shown in FIG. 15, the display style of the at least one floating window is the longitudinal display style.

By acquiring the setting information of the live streaming room, the floating window can be displayed based on the display style instructed by the setting information, such that the flexibility of the information display process and a display effect are improved, thereby improving the user experience.

In some embodiments, the live streaming interface further includes a decorative element such as a sticker. The at least one floating window may be displayed in a superimposed fashion on the upper or lower layer of the decorative element without affecting the display of the decorative element.

In some embodiments, the live streaming interface of the live streaming room includes a style setting control configured to set a display style of the at least one floating window. In the case that an audience needs to change the display style of the at least one floating window, the audience triggers the style setting control. The second electronic device displays a style setting interface in response to the trigger operation on the style setting control. The style setting interface is configured to set a display style of the at least one floating window, and includes a horizontal display control and a longitudinal display control.

By providing the style setting control on the live streaming interface, the audience can set the display style of the floating window by the style setting control, such that the display flexibility of the floating window is improved, and the floating window can be displayed based on the will of the audience, thereby improving the audience experience.

The audience may further adjust a display position of the at least one floating window. In some embodiments, once the audience drags the at least one floating window, the second electronic device adjusts the position of the at least one floating window in response to the drag operation on the at least one floating window. By adjusting the position of the floating window based on the drag operation on the at least one floating window, the floating window can be displayed based on the will of the audience, thereby improving the flexibility of the floating window display process and the audience experience.

With respect to the process of adjusting the display position of the at least one floating window, the second electronic device can determine whether to display the at least one floating window at the position or delete the at least one floating window based on the position upon completion of the drag operation.

Figure 16:
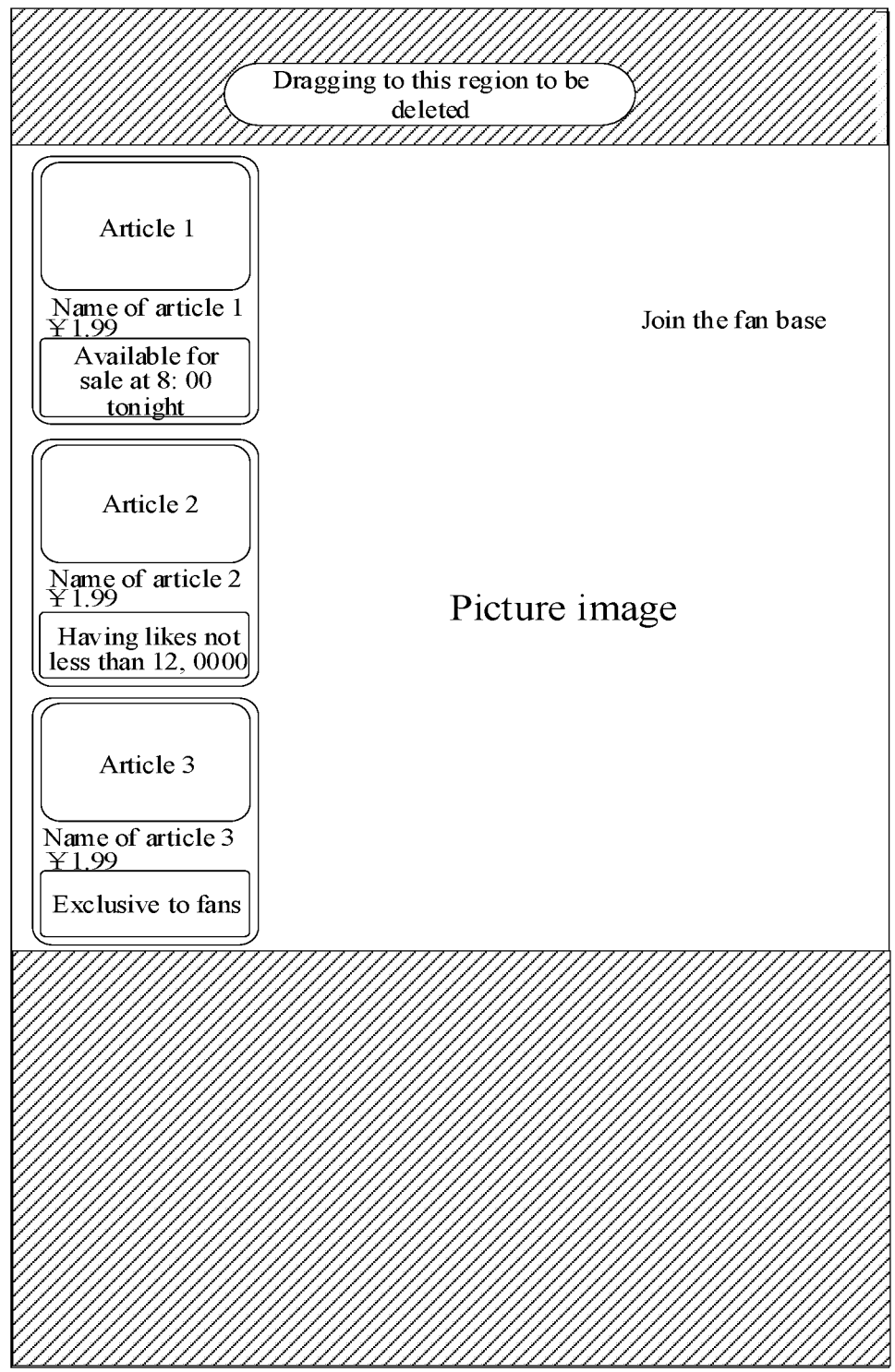
FIG. 16 is a schematic diagram showing a target region according to an exemplary embodiment.

In some embodiments, the second electronic device deletes the at least one floating window from the live streaming picture in the case that a corresponding position is a position in a target region upon completion of the drag operation. Referring to FIG. 16 which is a schematic diagram showing a target region according to an exemplary embodiment, the target region is located at the top and bottom of the live streaming interface. The audience can delete the at least one floating window by moving the at least one floating window to either of the two regions.

In some embodiments, the second electronic device determines the corresponding position upon completion of the drag operation as an adjusted position of the at least one floating window in the case that the corresponding position is a position in a non-target region upon completion of the drag operation.

The floating window can be deleted in the case that the floating window is dragged to the target region, and the floating window can be adjusted in the case that the floating window is dragged to any of other regions except the target region, such that the display flexibility of the floating window is improved, thereby improving the user experience.

The above process of adjusting the display position of at least one floating window is illustrated by taking the example in which the at least one floating window is taken as a whole in operation. In some embodiments, the audience may adjust the display position of the floating windows one by one, and the specific process is the same as the above, and is not repeated herein.

In some embodiments, the audience may know details of an article by triggering any one of the at least one floating window. The second electronic device displays an article detail interface in response to the trigger operation on any one of the at least one floating window. The article detail interface is configured to display article details of the target article object. An interface jumps to the article detail interface in the case that the floating window is triggered, such that the article details of the target article object can be displayed on the article detail interface. Thus, the audience can know the related information of the target article object, thereby improving the user experience.

The target article object is provided with allowable trade condition. The allowable trade condition includes the time available for sale is up, or the number of the likes of the live streaming room reaches a preset value, or an average watching time of an audience reaches a preset time, or a preset number of audiences join the fan base. Both the preset value and the preset number are any positive integer, and the preset time is any time, and the specific values of the above contents are not limited in the embodiment of the disclosure.

In the process that audiences watch live streaming, each second electronic device detects the operation of its corresponding audience account in real time, and sends the detected operation of the audience account to the server, such that the server can perform statistics on the live streaming data of the audience in the live streaming room; and further, the server or the first electronic device adds the at least one target article object to the article trade list in the live streaming room based on the live streaming data in the case that the live streaming data meets the allowable trading condition.

In some embodiments, in response to acquiring the live streaming data, the server sends the live streaming data to the first electronic device, such that the first electronic device acquires the live streaming data in the live streaming room, and then adds a corresponding target article object to an article trade list in the live streaming room in the case that the live streaming data meets the allowable trade condition of the at least one target article object. That is, the target article object that meets the article trade condition is shelved on the live streaming room. In some embodiments, the first electronic device acquires the live streaming data in the live streaming room in real time, and then detects whether the live streaming data meets the allowable trade condition of the at least one target article object in response to acquiring the live steaming data, such that the above processes are performed in the case that the live streaming data meets the allowable trade condition of the at least one target article object.

With respect to the process of adding the corresponding target article object to the article trade list in the live streaming room, the first electronic device sends an article shelving request to the server, the article shelving request carrying an object identifier of a to-be-shelved target article object and a live streaming identifier of the live streaming room. The server adds the target article object corresponding to the object identifier to the article trade list in the live streaming room in response to receiving the article shelving request, and sends an object shelving instruction to the second electronic device. The second electronic device adds the at least one target article object to the article trade list in the live streaming in response to receiving the object shelving instruction.

The above process of shelving the target article object is described by taking the example that the first electronic device detects the live streaming data in the live streaming room, and then actively sends the article shelving request to the server to shelve the target article object on shelf. In some embodiments, the server detects the live streaming data in the live streaming room, and then automatically shelves the target article object that meets the allowable trade condition in the case that the live streaming data meets the allowable trade condition of at least one target article object. For example, the server receives the live streaming data in the live streaming room, and sends an article shelving instruction to the first electronic device and the second electronic device in the case that the live streaming data meets the allowable trade condition of the at least one target article object, and the first electronic device and the second electronic device add the at least one target article object to the article trade list of the live streaming room in response to receiving the article shelving instruction. The embodiments of the present disclosure do not limit the specific manner in which the embodiments are used.

The target article object is not shelved on the live streaming room in the case that the live streaming data in the live streaming room does not meet the allowable trade condition of the target article object, that is, the target article object is not displayed in the article trade list of the live streaming room, such that the audience cannot purchase the target article object. The target article object is shelved on the live streaming room in the case that the live streaming data in the live streaming room meets the allowable trade condition of the target article object, that is, the target article object is added to the article trade list in the live streaming room, such that the audience can purchase the target article object in the live streaming room, thereby prolonging the flow watching duration of the audience in the live streaming room, and improving the audience retention. In some embodiments, when the time available for sale is up, or the number of the likes from the audiences reaches a preset value, or a watching time of the audiences reaches a preset time, or the audiences join the fan base, the target article object is displayed in the article trade list in the live streaming room, such that the audience can correspondingly place an order on the target article object, thereby purchasing the target article object.

Figure 17:
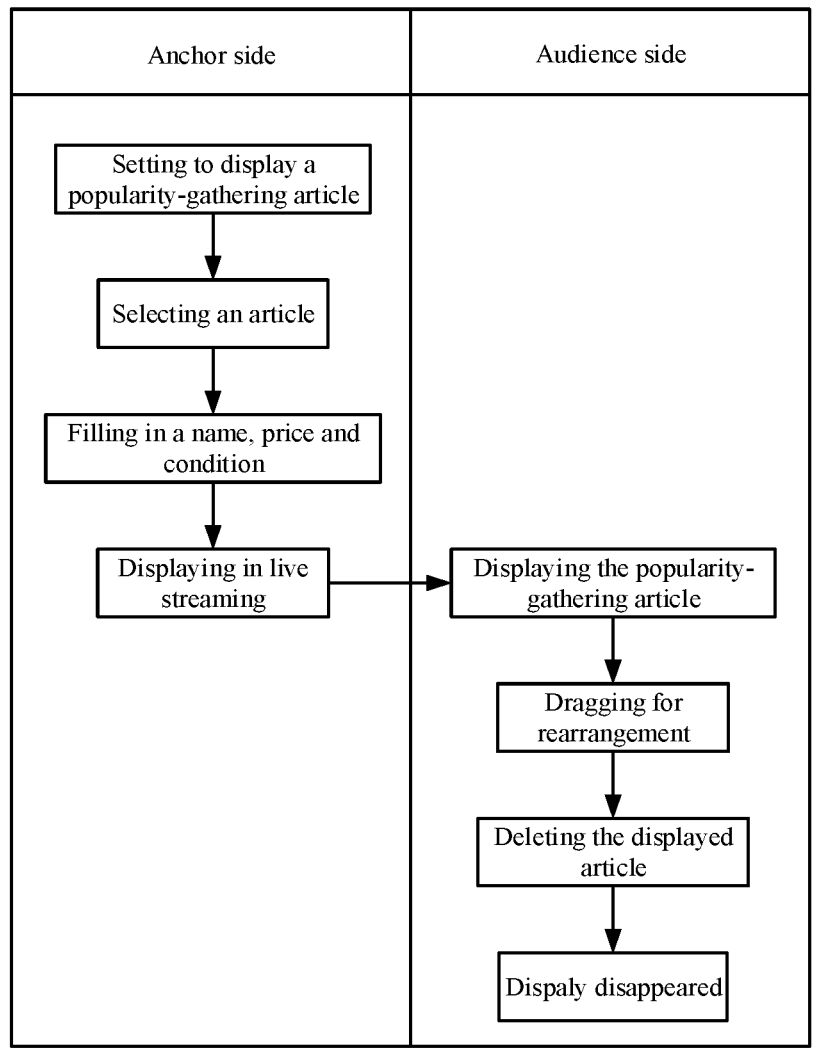
FIG. 17 is a flowchart of still another method for processing live streaming data according to an exemplary embodiment.

The process from 401 to 413 may refer to FIG. 17 which is a flowchart of still another method for processing live streaming data according to an exemplary embodiment. At the anchor side, the target article object to be displayed is selected by providing a popularity-gathering article display function, and the name, price and allowable trading condition of the target article object are filled in, such that the target article object is displayed on the live streaming picture during the live streaming process. At the audience side, the at least one floating window can be dragged to change its arrangement, such that the displayed target article object can be deleted, resulting in the disappeared display of the target article object.

In the solution of the embodiment of the present disclosure, the article selection interface is displayed in response to receiving the publish request of the anchor account, so as to display the at least one article object through the article selection interface, such that the anchor can select the at least one target article object from the at least one article object. Further, the at least one target article object and the related information of the at least one target article object are displayed on the live streaming interface by the at least one floating window, wherein the related information includes the allowable trade condition of the target article object. In this way, audience can see the target article object and the related information thereof directly from the floating window displayed on the live streaming interface, such that operation cost is reduced, and human-machine interaction efficiency and article display efficiency in the live streaming room are improved. Meanwhile, setting the target article with the allowable trade condition (e.g., having "likes" above a certain amount) can require a longer watching duration to satisfy the condition, thus the audience retention can be improved. By displaying the target article object in the live streaming room, a preview effect is achieved, such that the audience can be retained by previewing the hot article in advance. Thus, the target object is used as a flow attraction article to attract users, so as to prolong the flow watching duration and improve the audience retention in a single live streaming room. In addition, the target article object is set by the anchor, and the anchor can periodically provide welfare articles to ensure the popularity of the live streaming room. With offered welfare, more audiences are attracted to enter the live streaming room. Moreover, the audiences are incentivized to remain in the live streaming room after entering. Moreover, by playing a dynamic role of the anchor, the anchor fills in the related information of the target article object, and thus, both the anchor and the users can participate in the live streaming, improving the interaction between the anchor and the audiences.

Figure 18:
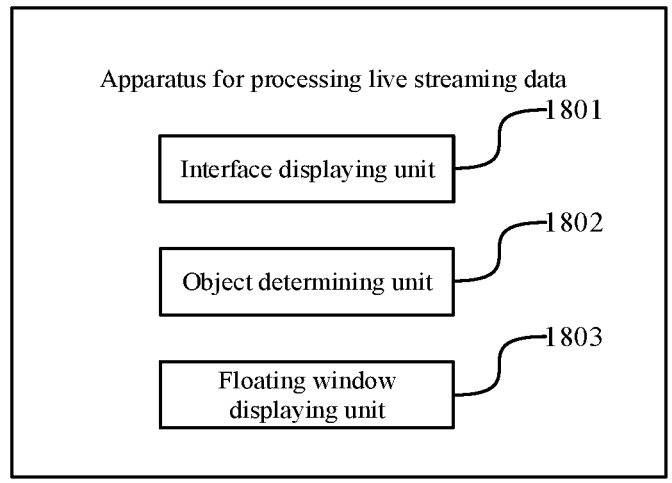
FIG. 18 is a flowchart of an apparatus for processing live streaming data according to an exemplary embodiment.

FIG. 18 is a flowchart of an apparatus for processing live streaming data according to an exemplary embodiment. Referring to FIG. 18, the apparatus includes:

an interface displaying unit 1801, configured to display an article selection interface in response to a publish request of an anchor account in a live streaming room, wherein the article selection interface includes at least one article object, and the publish request is configured to publish a to-be-traded article object in the live streaming;

an object determining unit 1802, configured to determine at least one target article object from the at least one article object based on a selection operation of the anchor account; and a floating window displaying unit 1803, configured to display at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

In the apparatus according to the embodiment of the present disclosure, the article selection interface is displayed in response to receiving the publish request of the anchor account, so as to display the at least one article object, such that the anchor can select the at least one target article object from the at least one article object, and the at least one target article object and related information of the at least one target article object are displayed by the at least one floating window on the live streaming interface, wherein the related information includes the allowable trade condition of the at least target article object, the variety of displayed information is increased, thereby improving the intelligence and flexibility of the article display process. In addition, an audience can see the target article object and the related information thereof directly from the floating window displayed on the live streaming interface, without any manual operation, such that operation cost is reduced, and man-machine interaction efficiency and article display efficiency in the live streaming room are improved.

In some embodiments, the article selection interface includes a target control and at least one selection control, wherein each of the at least one article object corresponds to one of the at least one selection control, and the target control is configured to provide a setting function of the target article object.

The object determining unit 1802 includes a first determining sub-unit, a display sub-unit, and a second determining sub-unit.

The first determining sub-unit is configured to determine, in response to a selection operation on the at least one selection control, an article object corresponding to the at least one selection control selected as at least one candidate article object.

The display sub-unit is configured to display an article setting interface in response to a trigger operation on the target control, wherein the article setting interface includes the at least one candidate article object.

The second determining sub-unit is configured to determine the at least one target article object from the at least one candidate article object in response to an operation on the at least one candidate article object on the article setting interface.

In some embodiments, the article setting interface includes at least one setting control, wherein each of the at least one candidate article object corresponds to one of the at least one setting control, and the setting control is configured to set the related information of the target article object and the target article object.

The second determining sub-unit is configured to, display, in response to a trigger operation on a target setting control, an information setting interface corresponding to the target setting control, wherein the target setting control is a setting control corresponding to any one of the at least one candidate article object, and the information interface is configured to provide a setting function of the related information; and determine, in response to the setting operation on the information setting interface, a candidate article object corresponding to the target setting control as the target article object.

In some embodiments, the information setting interface includes at least one input control.

The second determining sub-unit is further configured to acquire, in response to an input operation on the at least one input control, related information of the candidate article object corresponding to the target setting control; and determine, in response to a setting complete operation on the information setting interface, the candidate article object corresponding to the target setting control as the target article object.

In some embodiments, the second determining sub-unit is further configured to acquire, in response to the input operation on the at least one input control, an allowable trade condition of the candidate article object corresponding to the target setting control.

In some embodiments, the interface displaying unit 1801 is further configured to display an updated article setting interface, wherein the target article object corresponds to a modification setting control and a deletion setting control on the updated article setting interface.

In some embodiments, the article setting interface includes a style setting region, wherein the style setting region is configured to set display format of the floating window, and the style setting region includes a horizontal display control and a longitudinal display control; and the floating window displaying unit 1803 is configured to execute one of:

display the at least one floating window horizontally and parallelly on the live streaming interface in response to a trigger operation on the horizontal display control; or display the at least one floating window longitudinally and parallelly on the live streaming interface in response to a trigger operation on the longitudinal display control.

In some embodiments, the article setting interface includes a search control; and the apparatus further includes:

a keyword acquiring unit, configured to acquire an article keyword input in the search control in response to a trigger operation on the search control;

the object determining unit is further configured to determine a target candidate article object matching with the article key from the at least one candidate article object; and an object displaying unit, configured to display the target candidate article object matching with the article keyword.

In some embodiments, the target candidate article object corresponds to one setting control; and the interface displaying unit 1801 is further configured to display an information setting interface corresponding to the target candidate article object in response to a trigger operation on the setting control corresponding to the target candidate object, wherein the information setting interface is configured to provide a setting function of the related information.

In some embodiments, the live streaming interface includes an article management control; and the interface displaying unit 1801 is further configured to display a target article display interface in response to a trigger operation on the article management control, wherein the target article display interface includes the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

In some embodiments, the apparatus further includes:

a data acquiring unit, configured to acquiring live streaming data of the live streaming room, wherein the live streaming data includes at least one of a number of audiences, a type of the audiences, a live streaming duration, and a number of live streaming feedbacks; and an adding unit, configured to add a corresponding target article object to an article trade list in the live streaming room in the case that the live streaming data of the live streaming room meets the allowable trade condition of the at least one target article object.

Figure 19:
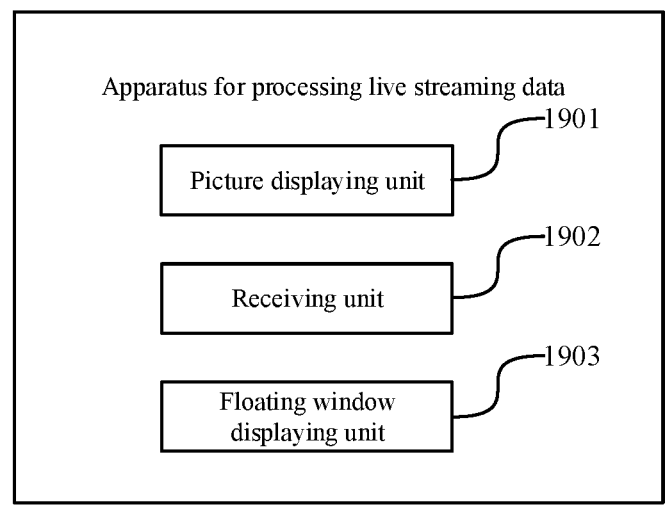
FIG. 19 is a flowchart of another apparatus for processing live streaming data according to an exemplary embodiment.

FIG. 19 is a flowchart of an apparatus for processing live streaming data according to an exemplary embodiment. Referring to FIG. 19, the apparatus includes:

a picture displaying unit 1901, configured to display, based on a received video stream of the live streaming room of an anchor account, a live streaming picture of the live streaming room;

a receiving unit 1902, configured to receive related information of at least one target article object in the live streaming room, wherein the target article object is determined by the anchor account from at least one article object, and the related information includes an allowable trade condition of the at least one target article object, and the allowable trade condition being configured to indicate a condition that needs to be met by the live streaming data of the live streaming room in the case that the target article object is tradable; and a floating window displaying unit 1903, configured to display at least one floating window on the live streaming picture, wherein the floating window is configured to display a corresponding target article object and related information.

In the apparatus according to the embodiment of the present disclosure, the live streaming picture of the anchor account is displayed based on the received video stream, the related information of the target article objects is received, and then the target article objects and the related information are displayed on the live streaming picture by the floating window, wherein the related information includes the allowable trade condition of the target article objects. In addition, audiences can directly see these target article objects as long as they enter the live streaming room, and know the allowable trade condition of the target article objects, without any manual operation, thereby improving the article display efficiency in the live streaming room.

In some embodiments, the floating window displaying unit 1903 is configured to acquire setting information of the live streaming room, the setting information including first setting information and second setting information, wherein the setting information includes first setting information and second setting information, wherein the first setting information instructs setting a display style of the at least one floating window as a horizontal display style, and the second setting information instructs setting the display style of the at least one floating window as a longitudinal display style; and display the at least one floating window based on a display style instructed by the setting information.

In some embodiments, the live streaming interface of the live streaming room includes a style setting control; and the apparatus further includes:

a first interface displaying unit, configured to display a style setting interface in response to a trigger operation on the style setting control, wherein the style setting interface is configured to set a display style of the at least one floating window, and includes a horizontal display control and a longitudinal display control.

In some embodiments, the apparatus further includes:

an adjusting unit, configured to adjust a display position of the at least one floating window in response to a drag operation on the at least one floating window.

In some embodiments, the adjusting unit is configured to execute one of:

deleting the at least one floating window from the live streaming picture in the case that a corresponding position is a position in a target region upon completion of the drag operation; and determining the corresponding position upon completion of the dragging operation as an adjusted display position of the at least one floating window in the case that the corresponding position is a position in a non-target region upon completion of the drag operation.

In some embodiments, the apparatus further includes:

a second interface displaying unit, configured to display an article detail interface in response to a trigger operation on any one of the at least one floating window, wherein the article detail interface is configured to display article details of a corresponding target article object.

In some embodiments, the apparatus further includes:

an adding unit, configured to add a corresponding target article object to an article trade list in the live streaming room in the case that the live streaming data of the live streaming room meets the allowable trade condition of the at least one target article object.

Figure 20:
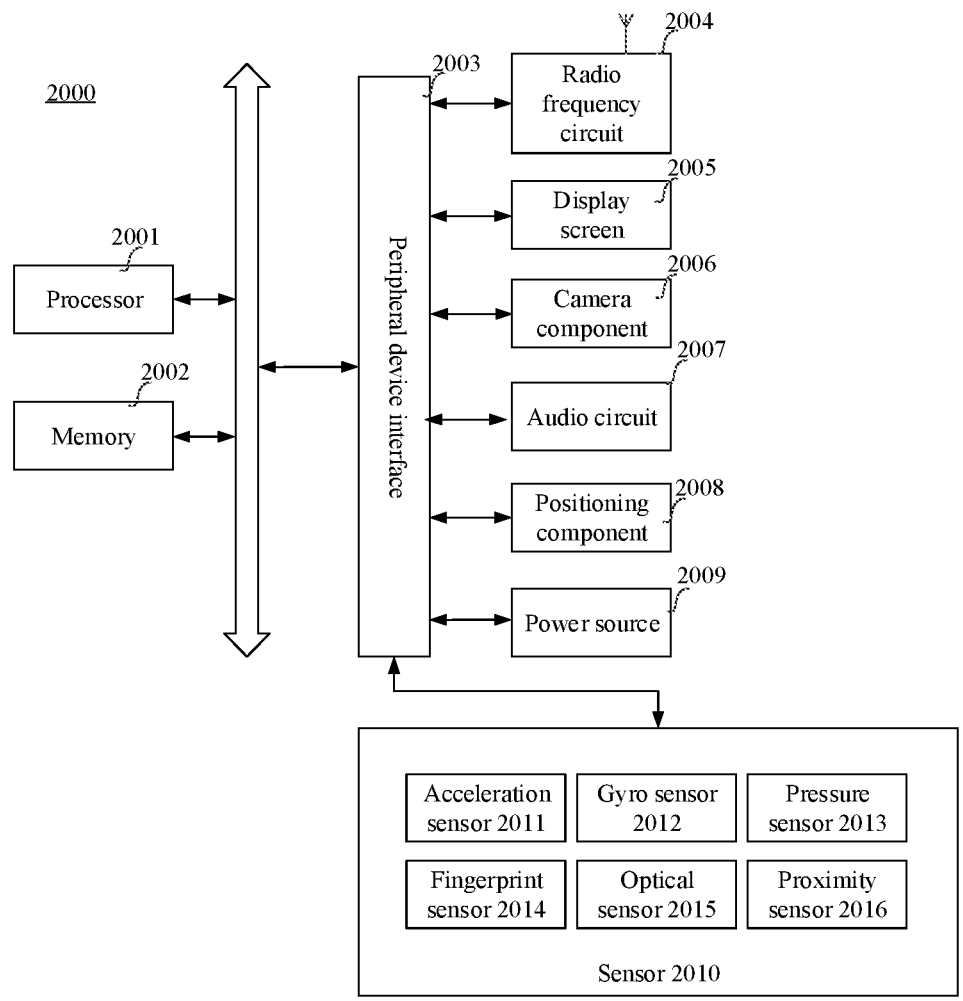
FIG. 20 is a block diagram of an electronic device 2000 according to an exemplary embodiment.

FIG. 20 is a block diagram of an electronic device 2000 according to an exemplary embodiment. The electronic device 2000 may be a smart phone, a tablet computer, a moving picture experts group audio layer III (MP3) player, a moving picture experts group audio layer IV (MP4) player, a laptop portable computer or a desktop computer. The electronic device 2000 may also be referred to as a user device, a portable electronic device, a laptop electronic device, a desktop electronic device, and the like.

Typically, the electronic device 2000 includes: one or more processors 2001 and one or more memories 2002.

The processor 2001 may include one or more processing cores, such as a 4-core processor, an 8-core processor, or the like. The processor 2001 may be implemented in any one of hardware forms of a digital signal processor (DSP), a field-programmable gate array (FPGA), and a programmable logic array (PLA). The processor 2001 may also include a main processor and a coprocessor. The main processor is a processor for processing the data in an awake state, and is also called a central processing unit (CPU). The coprocessor is a low-power-consumption processor for processing the data in a standby state. In some embodiments, the processor 2001 may be integrated with a graphics processing unit (GPU), which is configured to render and draw the content that needs to be displayed by a display screen. In some embodiments, the processor 2001 may also include an artificial intelligence (AI) processor configured to process computational operations related to machine learning.

The memory 2002 may include one or more computer-readable storage medias, which may be non-transitory. The memory 2002 may further include a high-speed random access memory, as well as a non-volatile memory, such as one or more disk storage devices and flash storage devices. In some embodiments, the non-transitory computer-readable storage medium in the memory 2002 is configured to store at least one program code. The at least one program code is configured to be executed by the processor 2001 to perform the method for processing the live streaming data according to the method embodiments of the present disclosure.

In some embodiments, the electronic device 2000 may further include: a peripheral device interface 2003 and at least one peripheral device. The processor 2001, the memory 2002, and the peripheral device interface 2003 may be connected by a bus or a signal line. Each peripheral device may be connected to the peripheral device interface 2003 by a bus, a signal line, or a circuit board. In some embodiments, the peripheral device includes at least one of a radio frequency circuit 2004, a display screen 2005, a camera component 2006, an audio circuit 2007, a positioning component 2008, and a power source 2009.

The peripheral device interface 2003 may be configured to connect at least one peripheral device associated with an input/output (I/O) to the processor 2001 and the memory 2002. In some embodiments, the processor 2001, the memory 2002 and the peripheral device interface 2003 are integrated on the same chip or circuit board. In some other embodiments, any one or two of the processor 2001, the memory 2002 and the peripheral device interface 2003 may be implemented on a separate chip or circuit board, which is not limited in this embodiment.

The radio frequency circuit 2004 is configured to receive and transmit a radio frequency (RF) signal, which is also referred to as an electromagnetic signal. The radio frequency circuit 2004 communicates with a communication network and other communication devices via the electromagnetic signal. The radio frequency circuit 2004 converts an electrical signal into an electromagnetic signal for transmission, or converts the received electromagnetic signal into an electrical signal. In some embodiments, the radio frequency circuit 2004 includes an antenna system, an RF transceiver, one or more amplifiers, a tuner, an oscillator, a digital signal processor, a codec chipset, a subscriber identity module card, and the like. The radio frequency circuit 2004 can communicate with other electronic devices via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the RF circuit 2004 may also include a near-field communication (NFC) related circuit, which is not limited in the present disclosure.

The display screen 2005 is configured to display a user interface (UI). The UI may include graphics, texts, icons, videos, and any combination thereof. In the case that the display screen 2005 is a touch display screen, the display screen 2005 also has the capability to acquire touch signals on or over the surface of the display screen 2005. The touch signal may be input into the processor 2001 as a control signal for processing. At this time, the display screen 2005 may also be configured to provide virtual buttons and/or virtual keyboards, which are also referred to as soft buttons and/or soft keyboards. In some embodiments, one display screen 2005 may be disposed on the front panel of the electronic device 2000. In some other embodiments, at least two display screens 2005 may be disposed respectively on different surfaces of the electronic device 2000 or in a folded design. In some embodiments, the display screen 2005 may be a flexible display screen disposed on a bending or a folded surface of the electronic device 2000. Moreover, the display screen 2005 may be defined to an irregular shape other than a rectangle; that is, the display screen 2005 may be an irregular-shaped screen. The display screen 2005 may be manufactured in the material of a liquid crystal display (LCD), an organic light-emitting diode (OLED), or the like.

The camera component 2006 is configured to capture images or videos. In some embodiments, the camera component 2006 includes a front camera and a rear camera. Usually, the front camera is placed on the front panel of the electronic device 2000, and the rear camera is placed on the back of the electronic device 2000. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 2006 may further include a flashlight. The flashlight may be a mono-color temperature flashlight or a two-color temperature flashlight. The two-color temperature flash is a combination of a warm flashlight and a cold flashlight and may be used for light compensation at different color temperatures.

The audio circuit 2007 may include a microphone and a speaker. The microphone is configured to collect sound waves of users and environments, and convert the sound waves into electrical signals which are input into the processor 2001 for processing, or input into the RF circuit 2004 for voice communication. For the purpose of stereo acquisition or noise reduction, there may be a plurality of microphones respectively disposed at different locations of the electronic device 2000. The microphone may also be an array microphone or an omnidirectional acquisition microphone. The speaker is then configured to convert the electrical signals from the processor 2001 or the RF circuit 2004 into the sound waves. The speaker may be a conventional film speaker or a piezoelectric ceramic speaker. In the case that the speaker is the piezoelectric ceramic speaker, the electrical signal may be converted into not only human-audible sound waves but also the sound waves which are inaudible to humans for the purpose of ranging and the like. In some embodiments, the audio circuit 2007 may also include a headphone jack.

The positioning component 2008 is configured to position a current geographic location of the electronic device 2000 to implement navigation or location-based services (LBSs). The positioning component 2008 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 2009 is configured to power up various components in the electronic device 2000. The power source 2009 may be alternating current, direct current, a disposable battery, or a rechargeable battery. In the case that the power source 2009 includes the rechargeable battery, the rechargeable battery may support wired or wireless charging. The rechargeable battery may also support the fast charging technology.

In some embodiments, the electronic device 2000 further includes one or more sensors 2010. The one or more sensors 2010 include, but not limited to, an acceleration sensor 2011, a gyro sensor 2012, a pressure sensor 2013, a fingerprint sensor 2014, an optical sensor 2015, and a proximity sensor 2016.

The acceleration sensor 2011 may detect magnitudes of accelerations on three coordinate axes of a coordinate system established by the electronic device 2000. In some embodiments, the acceleration sensor 2011 may be configured to detect components of a gravitational acceleration on the three coordinate axes. The processor 2001 may control the display screen 2005 to display a user interface in a transverse view or a longitudinal view based on a gravity acceleration signal collected by the acceleration sensor 2011. The acceleration sensor 2011 may also be configured to collect motion data of a game or a user.

The gyro sensor 2012 may detect a body direction and a rotation angle of the electronic device 2000, and may cooperate with the acceleration sensor 2011 to collect a 3D motion of the user on the electronic device 2000. Based on the data collected by the gyro sensor 2012, the processor 2001 can serve the following functions: motion sensing (such as changing the UI based on a user's tilt operation), image stabilization during shooting, game control and inertial navigation.

The pressure sensor 2013 may be disposed on a side frame of the electronic device 2000 and/or a lower layer of the display screen 2005. In the case that the pressure sensor 2013 is disposed on the side frame of the electronic device 2000, a user's holding signal to the electronic device 2000 may be detected. The processor 2001 may perform left-right hand recognition or quick operation based on the holding signal collected by the pressure sensor 2013. In the case that the pressure sensor 2013 is disposed on the lower layer of the display screen 2005, the processor 2001 controls an operable control on the UI based on a user's press or touch operation on the display screen 2005. The operable control includes at least one of a button control, a scroll bar control, an icon control, and a menu control.

The fingerprint sensor 2014 is configured to collect a user's fingerprint. The processor 2001 identifies the user's identity based on the fingerprint collected by the fingerprint sensor 2014, or the fingerprint sensor 2014 identifies the user's identity based on the collected fingerprint. In the case that the user's identity is identified as trusted, the processor 2001 authorizes the user to perform related sensitive operations, such as unlocking the screen, viewing encrypted information, downloading software, paying, and changing settings. The fingerprint sensor 2014 may be provided on the front, back or side of the electronic device 2000. In the case that the electronic device 2000 is provided with a physical button or a manufacturer's logo, the fingerprint sensor 2014 may be integrated with a physical button or the manufacturer's logo.

The optical sensor 2015 is configured to collect ambient light intensity. In one embodiment, the processor 2001 may control the display luminance of the display screen 2005 based on the ambient light intensity collected by the optical sensor 2015. In some embodiments, in the case that the ambient light intensity is higher, the display luminance of the display screen 2005 is increased; and in the case that the ambient light intensity is lower, the display luminance of the display screen 2005 is decreased. In some embodiments, the processor 2001 may also dynamically adjust shooting parameters of the camera component 2006 according to the ambient light intensity collected by the optical sensor 2015.

The proximity sensor 2016, also referred to as a distance sensor, is usually disposed on the front panel of the electronic device 2000. The proximity sensor 2016 is configured to capture a distance between the user and a front surface of the electronic device 2000. In some embodiments, in the case that the proximity sensor 2016 detects that the distance between the user and the front surface of the electronic device 2000 gradually smaller, the processor 2001 controls the display screen 2005 to switch from a screen-on state to a screen-off state. In response to detecting that the proximity sensor 2016 the distance between the user and the front surface of the electronic device 2000 gradually increases, the processor 2001 controls the display screen 2005 to switch from the screen-off state to the screen-on state.

It will be understood by those skilled in the art that the structure shown in FIG. 20 does not constitute a limitation to the electronic device 2000. In some embodiments, the electronic device 2000 may include more or less components than those illustrated, or combine some components or adopt different component arrangements.

In some embodiments, in the case where the electronic device 2000 illustrated in FIG. 20 is an electronic device on an anchor side as described above, the memory 2002 configured to store an instruction executable by the processor 2001, wherein the instruction, when executed by the processor 2001, causes the processor 2001 to perform the following processes:

displaying an article selection interface in response to a publish request of an anchor account in a live streaming room, wherein the article selection interface includes at least one article object, and the publish request is configured to publish a to-be-traded article object in the live streaming;

determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

In some embodiments, the article selection interface includes a target control and at least one selection control, wherein each of the at least one article object corresponds to one of the at least one selection control, and the target control is configured to provide a setting function of the target article object; and the processor 2001 is further configured to execute the instruction to perform the following processes:

determining, in response to a selection operation on the at least one selection control, an article object corresponding to the at least one selection control selected as at least one candidate article object;

displaying an article setting interface in response to a trigger operation on the target control, wherein the article setting interface includes the at least one candidate article object; and determining the at least one target article object from the at least one candidate article object in response to an operation on the at least one candidate article object on the article setting interface.

In some embodiments, the article setting interface includes at least one setting control, wherein each of the at least one candidate article object corresponds to one of the at least one setting control, and the setting control is configured to set the related information of the target article object and the target article object; and the processor 2001 is further configured to execute the instruction to perform the following processes:

displaying, in response to a trigger operation on a target setting control, an information setting interface corresponding to the target setting control, wherein the target setting control is a setting control corresponding to any one of the at least one candidate article object, and the information interface is configured to provide a setting function of the related information; and determining, in response to the setting operation on the information setting interface, a candidate article object corresponding to the target setting control as the target article object.

In some embodiments, the information setting interface includes at least one input control; and the processor 2001 is further configured to execute the instruction to perform the following processes:

acquiring, in response to an input operation on the at least one input control, related information of the candidate article object corresponding to the target setting control; and determining, in response to a setting complete operation on the information setting interface, the candidate article object corresponding to the target setting control as the target article object.

In some embodiments, the processor 2001 is further configured to execute the instruction to perform the following processes:

acquiring, in response to the input operation on the at least one input control, an allowable trade condition of the candidate article object corresponding to the target setting control.

In some embodiments, the processor 2001 is further configured to execute the instruction to perform the following processes:

displaying an updated article setting interface, wherein the target article object corresponds to a modification setting control and a deletion setting control on the updated article setting interface.

In some embodiments, the article setting interface includes a style setting region, wherein the style setting region is configured to set display format of the floating window, and the style setting region includes a horizontal display control and a longitudinal display control; and the processor 2001 is further configured to execute the instruction to perform the following processes:

displaying the at least one floating window horizontally and parallelly on the live streaming interface in response to a trigger operation on the horizontal display control; and displaying the at least one floating window longitudinally and parallelly on the live streaming interface in response to a trigger operation on the longitudinal display control.

In some embodiments, the article setting interface includes a search control; and the processor 2001 is further configured to execute the instruction to perform the following processes:

acquiring an article keyword input in the search control in response to a trigger operation on the search control;

determining a target candidate article object matching with the article keyword from the at least one candidate article object; and displaying the target candidate article object matching with the article keyword.

In some embodiments, the target candidate article object corresponds to one setting control; and the processor 2001 is further configured to execute the instruction to perform the following processes:

displaying an information setting interface corresponding to the target candidate article object in response to a trigger operation on the setting control corresponding to the target candidate article object, wherein the information setting interface is configured to provide a setting function of the related information.

In some embodiments, the live streaming interface includes an article management control; and the processor 2001 is further configured to execute the instruction to perform the following processes:

displaying a target article display interface in response to a trigger operation on the article management control, wherein the target article display interface includes the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

In some embodiments, the processor 2001 is further configured to execute the instruction to perform the following processes:

acquiring live streaming data of the live streaming room, wherein the live streaming data includes at least one of a number of audiences, a type of the audiences, a live streaming duration, and a number of live streaming feedbacks; and adding a corresponding target article object to an article trade list in the live streaming room in the case that the live streaming data meets the allowable trade condition of the at least one target article object.

In some embodiments, in the case where the electronic device 2000 illustrated in FIG. 20 is an electronic device on an audience side as described above, the memory 2002 configured to store an instruction executable by the processor 2001, wherein the instruction, when executed by the processor 2001, causes the processor 2001 to perform the following processes:

displaying, based on a received video stream of a live streaming room of an anchor account, a live streaming picture of the live streaming room;

receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

In some embodiments, the processor 2001 is further configured to execute the instruction to perform the following processes:

acquiring setting information of the live streaming room, wherein the setting information includes first setting information and second setting information, wherein the first setting information instructs setting a display style of the at least one floating window as a horizontal display style, and the second setting information instructs setting the display style of the at least one floating window as a longitudinal display style; and displaying the at least one floating window based on a display style instructed by the setting information.

In some embodiments, the live streaming interface of the live streaming room includes a style setting control; and the processor 2001 is further configured to execute the instruction to perform the following processes:

displaying a style setting interface in response to a trigger operation on the style setting control, wherein the style setting interface is configured to set a display style of the at least one floating window, and includes a horizontal display control and a longitudinal display control.

In some embodiments, the processor 2001 is further configured to execute the instruction to perform the following processes:

adjusting a display position of the at least one floating window in response to a drag operation on the at least one floating window.

In some embodiments, the processor 2001 is further configured to execute the instruction to perform one of the following processes:

deleting the at least one floating window from the live streaming picture in the case that a corresponding position is a position in a target region upon completion of the drag operation; and determining the corresponding position upon completion of the drag operation as an adjusted display position of the at least one floating window in the case that the corresponding position is a position in a non-target region upon completion of the drag operation.

In some embodiments, the processor 2001 is further configured to execute the instruction to perform one of the following processes:

displaying an article detail interface in response to a trigger operation on any one of the at least one floating window, wherein the article detail interface is configured to display article details of a corresponding target article object.

In some embodiments, the processor 2001 is further configured to execute the instruction to perform one of the following processes:

adding a corresponding target article object to an article trade list in the live streaming room in the case that the live streaming data of the live streaming room meets the allowable trade condition of the at least one target article object.

In some embodiments, storage medium including an instruction is further provided, such as the memory 2002 including the instruction. The instruction, when executed by a processor 2001 on an anchor side, causes the processor 2001 to perform the following processes:

displaying an article selection interface in response to a publish request of an anchor account in a live streaming room, wherein the article selection interface includes at least one article object, and the publish request is configured to publish a to-be-traded article object in the live streaming;

determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

In some embodiments, the article selection interface includes a target control and at least one selection control, wherein each of the at least one article object corresponds to one of the at least one selection control, and the target control is configured to provide a setting function of the target article object; and the processor 2001 in the electronic device 2000 on the anchor side is further configured to execute the instruction to perform the following processes:

determining, in response to a selection operation on the at least one selection control, an article object corresponding to the at least one selection control selected as at least one candidate article object;

displaying an article setting interface in response to a trigger operation on the target control, wherein the article setting interface includes the at least one candidate article object; and determining the at least one target article object from the at least one candidate article object in response to an operation on the at least one candidate article object on the article setting interface.

In some embodiments, the article setting interface includes at least one setting control, wherein each of the at least one candidate article object corresponds to one of the at least one setting control, and the setting control is configured to set the related information of the target article object and the target article object; and the processor 2001 in the electronic device 2000 on the anchor side is further configured to execute the instruction to perform the following processes:

displaying, in response to a trigger operation on a target setting control, an information setting interface corresponding to the target setting control, wherein the target setting control is a setting control corresponding to any one of the at least one candidate article object, and the information interface is configured to provide a setting function of the related information; and determining, in response to the setting operation on the information setting interface, a candidate article object corresponding to the target setting control as the target article object.

In some embodiments, the information setting interface includes at least one input control; and the processor 2001 in the electronic device 2000 on the anchor side is further configured to execute the instruction to perform the following processes:

acquiring, in response to an input operation on the at least one input control, related information of the candidate article object corresponding to the target setting control; and determining, in response to a setting complete operation on the information setting interface, the candidate article object corresponding to the target setting control as the target article object.

In some embodiments, the processor 2001 in the electronic device 2000 on the anchor side is further configured to execute the instruction to perform the following processes:

acquiring, in response to the input operation on the at least one input control, an allowable trade condition of the candidate article object corresponding to the target setting control.

In some embodiments, the processor 2001 in the electronic device 2000 on the anchor side is further configured to execute the instruction to perform the following processes:

displaying an updated article setting interface, wherein the target article object corresponds to a modification setting control and a deletion setting control on the updated article setting interface.

In some embodiments, the article setting interface includes a style setting region, wherein the style setting region is configured to set display format of the floating window, and the style setting region includes a horizontal display control and a longitudinal display control; and the processor 2001 in the electronic device 2000 on the anchor side is further configured to execute the instruction to perform the following processes:

displaying the at least one floating window horizontally and parallelly on the live streaming interface in response to a trigger operation on the horizontal display control; and displaying the at least one floating window longitudinally and parallelly on the live streaming interface in response to a trigger operation on the longitudinal display control.

In some embodiments, the article setting interface includes a search control; and the processor 2001 in the electronic device 2000 on the anchor side is further configured to execute the instruction to perform the following processes:

acquiring an article keyword input in the search control in response to a trigger operation on the search control;

determining a target candidate article object matching with the article keyword from the at least one candidate article object; and displaying the target candidate article object matching with the article keyword.

In some embodiments, the target candidate article object corresponds to one setting control; and the processor 2001 in the electronic device 2000 on the anchor side is further configured to execute the instruction to perform the following processes:

displaying an information setting interface corresponding to the target candidate article object in response to a trigger operation on the setting control corresponding to the target candidate article object, wherein the information setting interface is configured to provide a setting function of the related information.

In some embodiments, the live streaming interface includes an article management control; and the processor 2001 in the electronic device 2000 on the anchor side is further configured to execute the instruction to perform the following processes:

displaying a target article display interface in response to a trigger operation on the article management control, wherein the target article display interface includes the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

In some embodiments, the processor 2001 in the electronic device 2000 on the anchor side is further configured to execute the instruction to perform the following processes:

acquiring live streaming data of the live streaming room, wherein the live streaming data includes at least one of a number of audiences, a type of the audiences, a live streaming duration, and a number of live streaming feedbacks; and adding a corresponding target article object to an article trade list in the live streaming room in the case that the live streaming data meets the allowable trade condition of the at least one target article object.

In addition, the processor 2001 in the electronic device 2000 on an audience side is configured to execute the instruction to perform the following processes:

displaying, based on a received video stream of a live streaming room of an anchor account, a live streaming picture of the live streaming room;

receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

In some embodiments, the processor 2001 in the electronic device 2000 on the audience side is configured to execute the instruction to perform the following processes:

acquiring setting information of the live streaming room, wherein the setting information includes first setting information and second setting information, wherein the first setting information instructs setting a display style of the at least one floating window as a horizontal display style, and the second setting information instructs setting the display style of the at least one floating window as a longitudinal display style; and displaying the at least one floating window based on a display style instructed by the setting information.

In some embodiments, the live streaming interface of the live streaming room includes a style setting control; and the processor 2001 in the electronic device 2000 on the audience side is configured to execute the instruction to perform the following processes:

displaying a style setting interface in response to a trigger operation on the style setting control, wherein the style setting interface is configured to set a display style of the at least one floating window, and includes a horizontal display control and a longitudinal display control.

In some embodiments, the processor 2001 in the electronic device 2000 on the audience side is configured to execute the instruction to perform the following processes:

adjusting a display position of the at least one floating window in response to a drag operation on the at least one floating window.

In some embodiments, the processor 2001 in the electronic device 2000 on the audience side is configured to execute the instruction to perform the following processes:

deleting the at least one floating window from the live streaming picture in the case that a corresponding position is a position in a target region upon completion of the drag operation; and determining the corresponding position upon completion of the drag operation as an adjusted display position of the at least one floating window in the case that the corresponding position is a position in a non-target region upon completion of the drag operation.

In some embodiments, the processor 2001 in the electronic device 2000 on the audience side is configured to execute the instruction to perform the following processes:

displaying an article detail interface in response to a trigger operation on any one of the at least one floating window, wherein the article detail interface is configured to display article details of a corresponding target article object.

In some embodiments, the processor 2001 in the electronic device 2000 on the audience side is configured to execute the instruction to perform the following processes:

adding a corresponding target article object to an article trade list in the live streaming room in the case that the live streaming data of the live streaming room meets the allowable trade condition of the at least one target article object.

In some embodiments, the storage medium may be a non-transitory computer-readable storage medium. For example, the non-transitory computer-readable storage medium may include a read-only memory (ROM), a random-access memory (RAM), a compact disc read-only memory, (CD-ROM), a magnetic tape, a floppy disk, an optical data storage device, and the like.

In some embodiments, a computer program product storing one or more instructions therein is provided, wherein the one or more instructions, when executed by a processor 2001 on an anchor side, cause the processor 2001 to perform the following processes:

displaying an article selection interface in response to a publish request of an anchor account in a live streaming room, wherein the article selection interface includes at least one article object, and the publish request is configured to publish a to-be-traded article object in the live streaming;

determining at least one target article object from the at least one article object based on a selection operation of the anchor account; and displaying at least one floating window on a live streaming interface of the live streaming room, wherein the floating window is configured to display a corresponding target article object and related information, the related information including an allowable trade condition of the at least one target article object, the allowable trade condition being configured to indicate a condition that needs to be met by the live streaming data of the live streaming room in the case that the target article object is tradable.

In some embodiments, the article selection interface includes a target control and at least one selection control, wherein each of the at least one article object corresponds to one of the at least one selection control, and the target control is configured to provide a setting function of the target article object; and the processor 2001 in the electronic device on the anchor side is configured to execute the one or more instructions to perform the following processes:

determining, in response to a selection operation on the at least one selection control, an article object corresponding to the at least one selection control selected as at least one candidate article object;

displaying an article setting interface in response to a trigger operation on the target control, wherein the article setting interface includes the at least one candidate article object; and determining the at least one target article object from the at least one candidate article object in response to an operation on the at least one candidate article object on the article setting interface.

In some embodiments, the article setting interface includes at least one setting control, wherein each of the at least one candidate article object corresponds to one of the at least one setting control, and the setting control is configured to set the related information of the target article object and the target article object; and the processor 2001 in the electronic device on the anchor side is configured to execute the one or more instructions to perform the following processes:

displaying, in response to a trigger operation on a target setting control, an information setting interface corresponding to the target setting control, wherein the target setting control is a setting control corresponding to any one of the at least one candidate article object, and the information interface is configured to provide a setting function of the related information; and determining, in response to the setting operation on the information setting interface, a candidate article object corresponding to the target setting control as the target article object.

In some embodiments, the information setting interface includes at least one input control; and the processor 2001 in the electronic device on the anchor side is configured to execute the one or more instructions to perform the following processes:

acquiring, in response to an input operation on the at least one input control, related information of the candidate article object corresponding to the target setting control; and determining, in response to a setting complete operation on the information setting interface, the candidate article object corresponding to the target setting control as the target article object.

In some embodiments, the processor 2001 in the electronic device on the anchor side is configured to execute the one or more instructions to perform the following processes:

acquiring, in response to the input operation on the at least one input control, an allowable trade condition of the candidate article object corresponding to the target setting control.

In some embodiments, the processor 2001 in the electronic device on the anchor side is configured to execute the one or more instructions to perform the following processes:

displaying an updated article setting interface, wherein the target article object corresponds to a modification setting control and a deletion setting control on the updated article setting interface.

In some embodiments, the article setting interface includes a style setting region, wherein the style setting region is configured to set display format of the floating window, and the style setting region includes a horizontal display control and a longitudinal display control; and the processor 2001 in the electronic device on the anchor side is configured to execute the one or more instructions to perform the following processes:

displaying the at least one floating window horizontally and parallelly on the live streaming interface in response to a trigger operation on the horizontal display control; and displaying the at least one floating window longitudinally and parallelly on the live streaming interface in response to a trigger operation on the longitudinal display control.

In some embodiments, the article setting interface includes a search control; and the processor 2001 in the electronic device on the anchor side is configured to execute the one or more instructions to perform the following processes:

acquiring an article keyword input in the search control in response to a trigger operation on the search control;

determining a target candidate article object matching with the article keyword from the at least one candidate article object; and displaying the target candidate article object matching with the article keyword.

In some embodiments, the target candidate article object corresponds to one setting control; and the processor 2001 in the electronic device on the anchor side is configured to execute the one or more instructions to perform the following processes:

displaying an information setting interface corresponding to the target candidate article object in response to a trigger operation on the setting control corresponding to the target candidate article object, wherein the information setting interface is configured to provide a setting function of the related information.

In some embodiments, the live streaming interface includes an article management control; and the processor 2001 in the electronic device on the anchor side is configured to execute the one or more instructions to perform the following processes:

displaying a target article display interface in response to a trigger operation on the article management control, wherein the target article display interface includes the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

In some embodiments, the processor 2001 in the electronic device on the anchor side is configured to execute the one or more instructions to perform the following processes:

acquiring live streaming data of the live streaming room, wherein the live streaming data includes at least one of a number of audiences, a type of the audiences, a live streaming duration, and a number of live streaming feedbacks; and adding a corresponding target article object to an article trade list in the live streaming room in the case that the live streaming data meets the allowable trade condition of the at least one target article object.

In addition, the processor 2001 in the electronic device on an audience side is configured to execute the one or more instructions to perform the following processes:

displaying, based on a received video stream of a live streaming room of an anchor account, a live streaming picture of the live streaming room;

receiving related information of at least one target article object in the live streaming room, wherein the target article object is determined by the anchor account from at least one article object, and the related information includes an allowable trade condition of the at least one target article object, the allowable trade condition being configured to indicate a condition that needs to be met by the live streaming data of the live streaming room in the case that the target article object is tradable; and displaying at least one floating window on the live streaming picture, wherein the floating window is configured to display a corresponding target article object and related information.

In some embodiments, the processor 2001 in the electronic device on the audience side is configured to execute the one or more instructions to perform the following processes:

acquiring setting information of the live streaming room, wherein the setting information includes first setting information and second setting information, wherein the first setting information instructs setting a display style of the at least one floating window as a horizontal display style, and the second setting information instructs setting the display style of the at least one floating window as a longitudinal display style; and displaying the at least one floating window based on a display style instructed by the setting information.

In some embodiments, the live streaming interface of the live streaming room includes a style setting control; and the processor 2001 in the electronic device on an audience side is configured to execute the one or more instructions to perform the following processes:

displaying a style setting interface in response to a trigger operation on the style setting control, wherein the style setting interface is configured to set a display style of the at least one floating window, and includes a horizontal display control and a longitudinal display control.

In some embodiments, the processor 2001 in the electronic device on an audience side is configured to execute the one or more instructions to perform the following processes:

adjusting a display position of the at least one floating window in response to a drag operation on the at least one floating window.

In some embodiments, the processor 2001 in the electronic device on an audience side is configured to execute the one or more instructions to perform the following processes:

deleting the at least one floating window from the live streaming picture in the case that a corresponding position is a position in a target region upon completion of the drag operation; and determining the corresponding position upon completion of the drag operation as an adjusted display position of the at least one floating window in the case that the corresponding position is a position in a non-target region upon completion of the drag operation.

In some embodiments, the processor 2001 in the electronic device on an audience side is configured to execute the one or more instructions to perform the following processes:

displaying an article detail interface in response to a trigger operation on any one of the at least one floating window, wherein the article detail interface is configured to display article details of a corresponding target article object.

In some embodiments, the processor 2001 in the electronic device on an audience side is configured to execute the one or more instructions to perform the following processes:

adding a corresponding target article object to an article trade list in the live streaming room in the case that the live streaming data of the live streaming room meets the allowable trade condition of the at least one target article object.

All the embodiments of the present disclosure can be executed individually or in combination with other embodiments, and they are all regarded as the protection scope of the present disclosure.

What is claimed is:

1. A method for processing live streaming data, executed by an electronic device, comprising:
    displaying an article selection interface in response to a publish request of an anchor account in a live streaming room, wherein the article selection interface comprises at least one article object, and the publish request is configured to publish a to-be-traded article object in the live streaming;
    determining at least one target article object from the at least one article object based on a selection operation of the anchor account;
    displaying at least one floating window on a live streaming interface of the live streaming room, wherein each floating window is configured to display a corresponding target article object and related information, the related information comprising an allowable trade condition of the corresponding target article object, the allowable trade condition relates to the live streaming data, and the target article object becomes tradable in response to the allowable trade condition being met;
    displaying, in the case that the live streaming data does not meet an allowable trade condition of the target article object, the target article object in the floating window without displaying the target article object in an article trade list in the live streaming room so that the target article object is non-tradable; and
    adding, in the case that the live streaming data meets the allowable trade condition of the target article object, the target article object to the article trade list in the live streaming room so that the target article object is tradable.

2. The method according to claim 1, wherein the article selection interface comprises a target control and at least one selection control, wherein each of the at least one article object corresponds to one of the at least one selection control, and the target control is configured to provide a setting function of the target article object; and
    wherein determining the at least one target article object from the at least one article object based on the selection operation of the anchor account comprises:
    determining, in response to a selection operation on the at least one selection control, a selected article object corresponding to the at least one selection control as at least one candidate article object;
    displaying an article setting interface in response to a trigger operation on the target control, wherein the article setting interface comprises the at least one candidate article object; and
    determining the at least one target article object from the at least one candidate article object in response to an operation on the at least one candidate article object on the article setting interface.

3. The method according to claim 2, wherein the article setting interface comprises at least one setting control, wherein each of the at least one candidate article object corresponds to one of the at least one setting control, and the setting control is configured to set the related information of the target article object and the target article object; and
    wherein determining the at least one target article object from the at least one candidate article object in response to the operation on the at least one candidate article object on the article setting interface comprises:
    displaying, in response to a trigger operation on a target setting control, an information setting interface corresponding to the target setting control, wherein the target setting control is a setting control corresponding to any one of the at least one candidate article object, and the information setting interface is configured to provide a setting function of the related information; and
    determining, in response to a setting operation on the information setting interface, a candidate article object corresponding to the target setting control as the target article object.

4. The method according to claim 3, wherein the information setting interface comprises at least one input control; and
    wherein determining, in response to the setting operation on the information setting interface, the candidate article object corresponding to the target setting control as the target article object comprises:
    acquiring, in response to an input operation on the at least one input control, related information of the candidate article object corresponding to the target setting control; and
    determining, in response to a setting complete operation on the information setting interface, the candidate article object corresponding to the target setting control as the target article object.

5. The method according to claim 4, wherein acquiring, in response to the input operation on the at least one input control, the related information of the candidate article object corresponding to the target setting control comprises:
    acquiring, in response to the input operation on the at least one input control, an allowable trade condition of the candidate article object corresponding to the target setting control.

6. The method according to claim 3, further comprising:
    displaying an updated article setting interface, wherein the target article object corresponds to a modification setting control and a deletion setting control on the updated article setting interface.

7. The method according to claim 2, wherein the article setting interface comprises a style setting region, wherein the style setting region is configured to set display format of the floating window, and the style setting region comprises a horizontal display control and a longitudinal display control; and
    wherein displaying the at least one floating window on the live streaming interface of the live streaming room comprises one of:
    displaying the at least one floating window horizontally and parallelly on the live streaming interface in response to a trigger operation on the horizontal display control; and
    displaying the at least one floating window longitudinally and parallelly on the live streaming interface in response to a trigger operation on the longitudinal display control.

8. The method according to claim 2, wherein the article setting interface comprises a search control; and the method further comprises:
    acquiring an article keyword input in the search control in response to a trigger operation on the search control;
    determining a target candidate article object matching with the article keyword from the at least one candidate article object; and displaying the target candidate article object matching with the article keyword.

9. The method according to claim 8, wherein the target candidate article object corresponds to one setting control; and the method further comprises:
displaying an information setting interface corresponding to the target candidate article object in response to a trigger operation on the setting control corresponding to the target candidate article object, wherein the information setting interface is configured to provide a setting function of the related information.

10. The method according to claim 1, wherein the live streaming interface comprises an article management control; and
in response to displaying the at least one floating window on the live streaming interface of the live streaming room, the method further comprises:
displaying a target article display interface in response to a trigger operation on the article management control, wherein the target article display interface comprises the at least one target article object, and a deletion setting control and a modification setting control which correspond to the at least one target article object, wherein the deletion setting control is configured to delete a target article object corresponding to the deletion setting control from the at least one target article object, and the modification setting control is configured to modify related information of a target article object corresponding to the modification setting control.

11. The method according to claim 1, further comprising:
acquiring live streaming data of the live streaming room, wherein the live streaming data comprises at least one of a number of audiences, a number of fans in a fan base, a live streaming duration, and a number of live streaming feedbacks, and wherein the allowable trade condition is met when the number of audiences reaches a first preset number, the number of audiences in the fan base reaches a second preset number, the live streaming duration reaches a preset time, or the number of live streaming feedbacks reaches a preset value.

12. A method for processing live streaming data, executed by an electronic device, comprising:
displaying, based on a received video stream of a live streaming room of an anchor account, a live streaming picture of the live streaming room;
receiving related information of at least one target article object in the live streaming room, wherein the target article object is determined by the anchor account from at least one article object, and the related information comprises an allowable trade condition of the at least one target article object, the allowable trade condition relates to the live streaming data, and the target article object becomes tradable in response to the allowable trade condition being met; and
displaying at least one floating window on the live streaming picture, wherein each floating window is configured to display a corresponding target article object and related information,
displaying, in the case that the live streaming data does not meet an allowable trade condition of a target article object, the target article object in the floating window without displaying the target article object in an article trade list in the live streaming room so that the target article object is non-tradable; and
adding, in the case that the live streaming data meets the allowable trade condition of the target article object, the target article object to the article trade list in the live streaming room so that the target article object is tradable.

13. The method according to claim 12, wherein displaying the at least one floating window on the live streaming picture comprises:
acquiring setting information of the live streaming room, wherein the setting information comprises first setting information and second setting information, wherein the first setting information instructs setting a display style of the at least one floating window as a horizontal display style, and the second setting information instructs setting the display style of the at least one floating window as a longitudinal display style; and
displaying the at least one floating window based on a display style instructed by the setting information.

14. The method according to claim 12, wherein the live streaming interface of the live streaming room comprises a style setting control; and the method further comprises:
displaying a style setting interface in response to a trigger operation on the style setting control, wherein the style setting interface is configured to set a display style of the at least one floating window, and comprises a horizontal display control and a longitudinal display control.

15. The method according to claim 12, further comprising:
adjusting a display position of the at least one floating window in response to a drag operation on the at least one floating window.

16. The method according to claim 15, wherein adjusting the display position of the at least one floating window in response to the drag operation on the at least one floating window comprises one of:
deleting the at least one floating window from the live streaming picture in the case that a corresponding position is a position in a target region upon completion of the drag operation; and
determining the corresponding position upon completion of the drag operation as an adjusted display position of the at least one floating window in the case that the corresponding position is a position in a non-target region upon completion of the drag operation.

17. The method according to claim 12, further comprising:
displaying an article detail interface in response to a trigger operation on any one of the at least one floating window, wherein the article detail interface is configured to display article details of a corresponding target article object.

18. The method according to claim 12, wherein the allowable trade condition is met when a number of audiences reaches a first preset number, a number of audiences in a fan base reaches a second preset number, a live streaming duration reaches a preset time, or a number of live streaming feedbacks reaches a preset value.

19. An electronic device, comprising:
one or more processors; and
a memory configured to store an instruction executable by the processor,
wherein the instruction, when executed by the processor, causes the processor to perform the following processes:
displaying an article selection interface in response to a publish request of an anchor account in a live streaming room, wherein the article selection interface comprises at least one article object, and the publish request is configured to publish a to-be-traded article object in the live streaming;

determining at least one target article object from the at least one article object based on a selection operation of the anchor account;

displaying at least one floating window on a live streaming interface of the live streaming room, wherein each floating window is configured to display a corresponding target article object and related information, the related information comprising an allowable trade condition of the corresponding target article object, the allowable trade condition relates to live streaming data, and the target article object becomes tradable in response to the allowable trade condition being met, displaying, in the case that the live streaming data does not meet an allowable trade condition of a target article object, the target article object in a floating window without displaying the target article object in an article trade list in the live streaming room so that the target article object is non-tradable; and adding, in the case that the live streaming data meets the allowable trade condition of the target article object, the target article object to the article trade list in the live streaming room so that the target article object is tradable.

* * * * *